United States Patent
Yang et al.

(10) Patent No.: US 11,606,619 B2
(45) Date of Patent: Mar. 14, 2023

(54) DISPLAY DEVICE AND DISPLAY DEVICE CONTROL METHOD

(71) Applicant: SAMSUNG ELECTRONICS CO., LTD., Suwon-si (KR)

(72) Inventors: Kwansik Yang, Suwon-si (KR); Jaehong Kim, Suwon-si (KR); Sangkyung Lee, Suwon-si (KR); Jihak Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/980,280

(22) PCT Filed: Jan. 7, 2019

(86) PCT No.: PCT/KR2019/000174
§ 371 (c)(1),
(2) Date: Sep. 11, 2020

(87) PCT Pub. No.: WO2019/203421
PCT Pub. Date: Oct. 24, 2019

(65) Prior Publication Data
US 2021/0044871 A1 Feb. 11, 2021

(30) Foreign Application Priority Data
Apr. 17, 2018 (KR) .................. 10-2018-0044562

(51) Int. Cl.
*H04N 21/472* (2011.01)
*H04N 21/4722* (2011.01)
(Continued)

(52) U.S. Cl.
CPC ....... *H04N 21/4722* (2013.01); *H04N 21/431* (2013.01); *H04N 21/478* (2013.01); *H04N 23/661* (2023.01)

(58) Field of Classification Search
None
See application file for complete search history.

(56) References Cited

U.S. PATENT DOCUMENTS

| 9,922,530 B2 | 3/2018 | Wu et al. |
| 2002/0066279 A1 | 6/2002 | Kiyomatsu |

(Continued)

FOREIGN PATENT DOCUMENTS

| CN | 104239433 | 12/2014 |
| CN | 105930533 | 9/2016 |

(Continued)

OTHER PUBLICATIONS

International Search Report and English-language translation for PCT/KR2019/000174 dated Apr. 9, 2019, 5 pages.

(Continued)

*Primary Examiner* — Jefferey F Harold
*Assistant Examiner* — Charles N Hicks
(74) *Attorney, Agent, or Firm* — Nixon & Vanderhye, P.C.

(57) ABSTRACT

A display device is disclosed. The disclosed display device comprises a display, a communication unit, a processor and a memory, wherein the memory stores instructions configured such that the processor: controls the communication unit, thereby allowing a request instruction, for requesting transmission of an image obtained using a camera included in a refrigerator, to be transmitted to the refrigerator when receiving an input for requesting information related to the refrigerator; controls the communication unit, thereby receiving at least one image from the refrigerator through the communication unit in response to the request instruction, obtaining first information related to the names of food ingredients according to recognition of food ingredients included in the at least one image, transmitting to first (Continued)

information to a server, and receiving cooking broadcast content obtained by the server; and controls the display so as to display the cooking broadcast content and the image together, wherein the cooking broadcast content can be obtained by the server using the first information and second information related to cooking information recognized from media content prestored in the server. In addition, at least a portion of the server can use a rule-based model or an artificial intelligence data recognition model learned according to at least one of machine learning, a neural network, or a deep learning algorithm. The rule-based model or the artificial intelligence data recognition model can estimate the cooking broadcast content by using food ingredient information as an input value.

15 Claims, 15 Drawing Sheets

(51) Int. Cl.
*H04N 21/431* (2011.01)
*H04N 21/478* (2011.01)
*H04N 23/661* (2023.01)

(56) References Cited

U.S. PATENT DOCUMENTS

| | | |
|---|---|---|
| 2014/0358287 A1 | 12/2014 | Lee et al. |
| 2016/0182868 A1* | 6/2016 | Izawa .............. H04N 5/232411 |
| | | 62/125 |
| 2016/0371764 A1* | 12/2016 | Wilkinson ......... G06Q 30/0631 |
| 2017/0139385 A1* | 5/2017 | Young .................. G05B 19/048 |
| 2017/0185596 A1* | 6/2017 | Spirer .................. H04N 21/475 |
| 2017/0186079 A1 | 6/2017 | Kim et al. |
| 2017/0284733 A1 | 10/2017 | Chiu et al. |
| 2018/0011674 A1* | 1/2018 | Yoo .................... H04N 5/23222 |
| 2018/0059881 A1* | 3/2018 | Agboatwalla ....... G06F 3/04883 |
| 2019/0340674 A1* | 11/2019 | Vaananen ............... F25D 29/00 |

FOREIGN PATENT DOCUMENTS

| | | |
|---|---|---|
| CN | 106885441 | 6/2017 |
| JP | 2002-156181 | 5/2002 |
| JP | 2004-086684 | 3/2004 |
| JP | 2011-039846 | 2/2011 |
| JP | 2014-209050 | 11/2014 |
| JP | 2017-015298 | 1/2017 |
| JP | 2017-182705 | 10/2017 |
| KR | 20-0164614 | 2/2000 |
| KR | 10-2009-0070075 | 7/2009 |
| KR | 10-2014-0026917 | 3/2014 |
| KR | 10-2014-0093045 | 7/2014 |
| KR | 10-2014-0139736 | 12/2014 |
| KR | 10-2015-0005131 | 1/2015 |
| KR | 10-2017-0076992 | 7/2017 |
| KR | 10-1754372 | 7/2017 |
| WO | 2018/043923 | 3/2018 |

OTHER PUBLICATIONS

Written Opinion of the ISA and English-language translation for PCT/KR2019/000174 dated Apr. 9, 2019, 14 pages.
Extended Search Report dated Feb. 22, 2021 in counterpart European Patent Application No. 19788486.9.
Office Action dated Jul. 16, 2022 in counterpart Korean Patent Application No. 10-2018-0044562 and English-language translation.
Examination Repod dated Aug. 5, 2022 in counterpart Indian Patent Application No. 202027044352 and English-language translation.
Office Action dated Sep. 14, 2022 in counterpart Chinese Patent Application No. 201980022877.1 nd English-language translation.
Communication pursuant to Article 94(3) EPC dated Dec. 2, 2022 in counterpart European Patent Application No. 19788486.9.

\* cited by examiner

DISPLAY DEVICE AND DISPLAY DEVICE CONTROL METHOD

FIELD

The disclosure relates to a content providing method using a display device, and more specifically to a display device providing a broadcast content on cooking corresponding to an instruction related to a refrigerator and a control method thereof.

DESCRIPTION OF RELATED ART

Recently, various content related to cooking are being generated. For example, with media content on how to buy fresh food ingredients, how to cook various cuisine using the food ingredients, and the like being generated, a user may check for desired content at any time and buy food ingredients or directly cook therefrom.

SUMMARY

The user may have to experience the inconvenience of checking for food ingredient currently in stock and searching for corresponding broadcast content on cooking in order to find a desired content on cooking method.

Accordingly, there is a need to provide a broadcast content on cooking with high relevance with the stored food ingredients of the various broadcast contents on cooking based on the food ingredients stored in a refrigerator of a user.

According to an embodiment, a display device includes a display, a communicator, a processor, and a memory, and the memory stores instructions set for the processor to, based on an input requesting information related to a refrigerator being received, control the communicator for a request instruction requesting a transmission of an image obtained by using a camera included in the refrigerator to be transmitted to the refrigerator, receive at least one image from the refrigerator through the communicator in response to the request instruction, obtain a first information related to a name of a food ingredient based on recognition of the food ingredient comprised in the at least one image, transmit the first information to the server, control the communicator to receive a broadcast content on cooking obtained by the server, and control the display to display the broadcast content on cooking along with the image, and the broadcast content on cooking is obtained by the server using the first information and a second information related cooking information recognized from a pre-stored media content in the server.

The display device according to an embodiment in which the first information may be a first text related to a name of a food ingredient included in the at least one image, and the second information related to the cooking information may be a second text obtained by obtaining at least one image frame related to cooking information by identifying an image frame included in a pre-stored media content in the server, and identifying the at least one image frame.

The display device according to an embodiment in which the cooking information may include at least one of a recipe or a name of a food ingredient.

The display device according to an embodiment in which the broadcast content on cooking may, based on a name of the food ingredient included in the first information being included in the second information, be obtained by using a media content corresponding to the second information.

The display device according to an embodiment in which the broadcast content on cooking may include a video clip obtained by using an image frame related to cooking information of a plurality of image frames comprising the pre-stored media content in the server.

The display device according to an embodiment in which the memory may store instructions set for the processor to, based on a user input selecting the broadcast content on cooking displayed on the display being received, store instructions set to playback the selected broadcast content on cooking.

The display device according to an embodiment in which the memory may store instructions set for the processor to identify a food ingredient requiring purchase by using the selected broadcast content on cooking and the first information.

The display device according to an embodiment in which the memory may store instructions set for the processor to display by including the food ingredient requiring purchase on a user interface guiding the purchase of the food ingredient.

According to an embodiment, a refrigerator comprises a camera, a communicator, a processor, and a memory, and the memory stores instructions set for the processor to, based on an input requesting information related to the refrigerator being received, obtain at least one image by using the camera, obtain a first information related to a name of a food ingredient based on recognition of the food ingredient comprised in the at least one image, transmit the first information to a server, control the communicator to receive a broadcast content on cooking obtained by the server, and control the communicator to transmit the broadcast content on cooking and the image to an external device, and the broadcast content on cooking is obtained by the server by using the first information and a second information related to cooking information recognized from a pre-stored media content in the server.

The server according to an embodiment may include a communicator, a processor, and a memory, and the memory may store instructions set for the processor to, based on an input requesting information related to the refrigerator being received through the communicator, control the communicator for a request instruction requesting the transmission of the image obtained by using a camera included in the refrigerator to be transmitted to the refrigerator, receive at least one image from the refrigerator through the communicator in response to the request instruction, obtain a first information related to a name of a food ingredient by recognizing the food ingredient included in the at least one image, obtain a broadcast content on cooking by using the first information and a second information related to cooking information recognized from a pre-stored media content, control the communicator to transmit the broadcast content on cooking and the image to an external device.

According to an embodiment, a control method of a display device includes, based on receiving input requesting information related to a refrigerator, transmitting a request instruction requesting transmission of an image obtained by using a camera included in the refrigerator to the refrigerator, receiving at least one image from the refrigerator corresponding to the request instruction, obtaining a first information related to a name of a food ingredient based on recognition of the food ingredient included in the at least one image, transmitting the first information to a server and receiving a broadcast content on cooking obtained by the server, and displaying the broadcast content on cooking with the image, and the broadcast content on cooking is obtained by the server using the first information and a second information related to cooking information recognized from a pre-stored media content in the server.

The control method of the display device according to an embodiment in which the first information may be a first text related to a name of a food ingredient included in the at least one image, and the second information related to the cooking information may be a second text obtained by obtaining at least one image frame related to cooking information by identifying an image frame included in a pre-stored media content in the server, and identifying the at least one image frame.

The control method of the display device according to an embodiment in which the broadcast content on cooking may, based on a name of the food ingredient included in the first information being included in the second information, be obtained by using a media content corresponding to the second information.

The control method of the display device according to an embodiment in which the broadcast content on cooking may include a video clip obtained by using an image frame related to cooking information of the plurality of image frames comprising the pre-stored media content in the server.

The control method of the display device according to an embodiment may include, based on a user input selecting the displayed broadcast content on cooking, playing back the selected broadcast content on cooking.

The control method of the display device according to an embodiment may include identifying a food ingredient requiring purchase by using the broadcast content on cooking and the first information.

The control method of the display device according to an embodiment may include displaying by including the food ingredient requiring purchase to a user interface guiding a purchase of the food ingredient.

According to an embodiment, a control method of a refrigerator includes, based on receiving input requesting information related to a refrigerator, obtaining at least one image including a food ingredient by using a camera, obtaining a first information related to a name of the food ingredient based on recognition of the food ingredient included in the at least one image, transmitting the first information to a server and receiving a broadcast content on cooking obtained by the server, and transmitting the broadcast content on cooking and the image to an external device, and the broadcast content on cooking is obtained by the server using the first information and a second information related to cooking information recognized from a pre-stored media content in the server.

According to an embodiment, a control method of a server includes, based on receiving input requesting information related to a refrigerator, transmitting a request instruction requesting a transmission of an image including a food ingredient, which is photographed by using a camera included in the refrigerator, receiving at least one image from the refrigerator corresponding to the request instruction, obtaining a first information related to a name of the food ingredient by recognizing the food ingredient included in the at least one image, obtaining a broadcast content on cooking by using a second information related to cooking information recognized from the first text and a pre-stored media content, and transmitting the broadcast content on cooking and the image to an external device.

According to an embodiment, a computer program product including a computer readable storing medium which stores instructions for executing in a computer includes, based on receiving input requesting information related to a refrigerating, transmitting a request instruction requesting transmission of an image, which is obtained by using a camera included in the refrigerator, to the refrigerator, receiving at least one image from the refrigerator corresponding to the request instruction, obtaining a first information related to a name of a food ingredient based on recognition of the food ingredient included in the at least one image, transmitting the first information to the server and receiving a broadcast content on cooking obtained by the server, and displaying the broadcast content on cooking with the image, and the broadcast content on cooking is obtained by the server using the first information and a second information related to cooking information recognized from a pre-stored media content in the server.

According to an embodiment, the display device may provide a broadcast content on cooking which uses food ingredients stored in a refrigerator.

According to an embodiment, the display device may provide a broadcast content on cooking to a user by using a text obtained in an image on a food ingredient stored in the refrigerator and text obtained from the broadcast content on cooking stored in a server.

According to an embodiment, the display device may guide in the purchase of food ingredients included in a recipe included in the broadcast content on cooking.

DETAILED DESCRIPTION OF EXAMPLE EMBODIMENTS

Figure 1A:
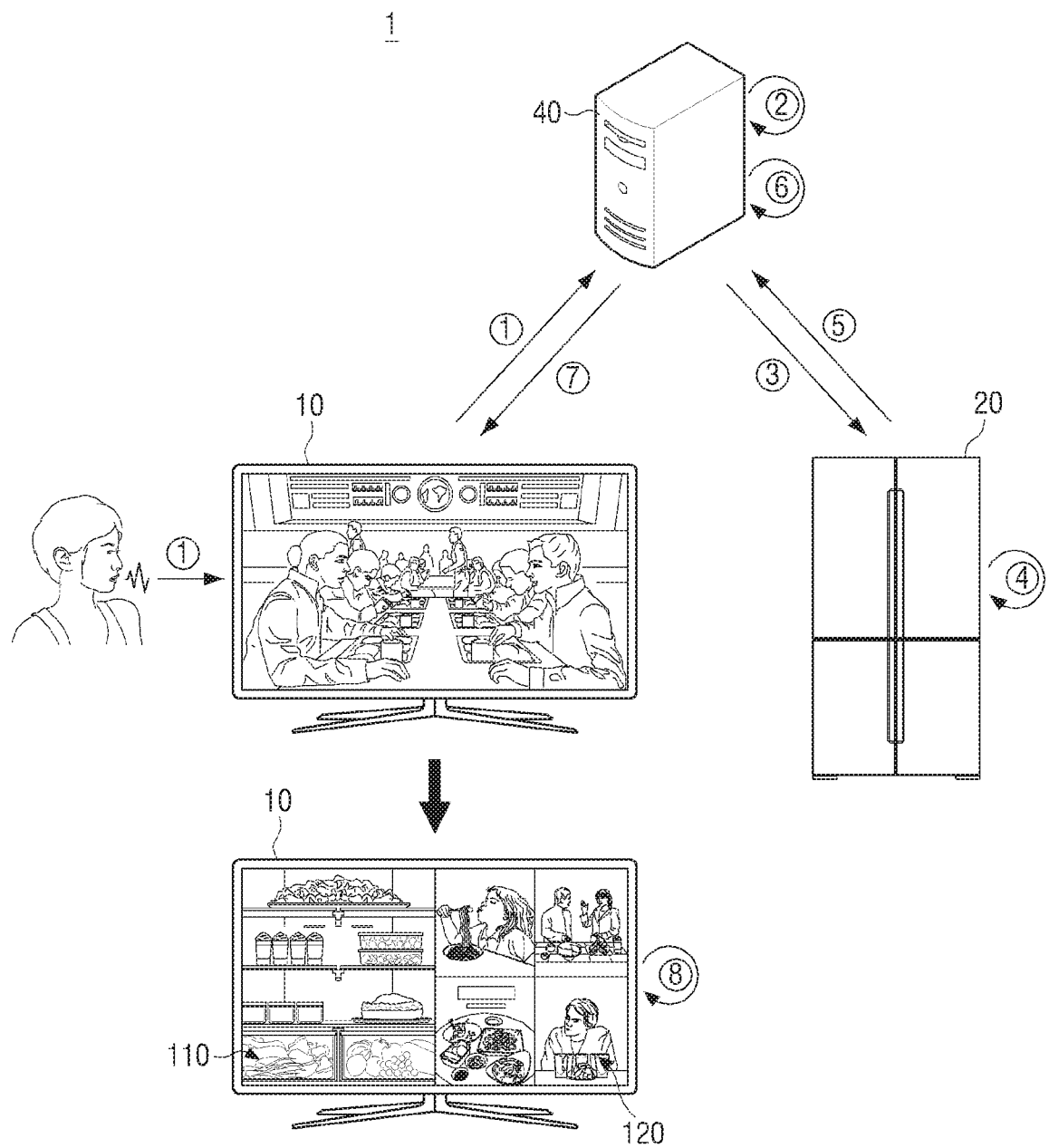
FIG. 1A is a diagram illustrating a situation in which a content recommendation system executes a function by using a user command input to a display device according to an embodiment.

Various embodiments of the disclosure will be described herein with reference to the accompanying drawings in a manner that will be easily understood by those of ordinary skill in the art. However, it should be noted that the various embodiments may be realized to various different forms and are not for limited to the specific embodiments described herein. In addition, parts not related to describing the embodiments clearly have been omitted, and like reference numerals may be used to refer to like elements throughout the disclosure.

The terms used in the embodiments are widely used general terms that have been selected considering the functions herein, but may vary depending on the intention of those skilled in the related art or a judicial precedent, the emergence of a new technologies, and the like. Accordingly, the terms used herein should not be defined by only the name of the terms, but based on the meaning of the terms and the overall content throughout the disclosure.

The terms used herein have merely been used to describe a specific embodiment, and not to limit the scope of the disclosure. A singular expression includes a plural expression, unless otherwise specified. In addition, when a certain part is indicated as being connected to another part, it is to be understood as not only the certain part being "directly connected to" another part, but also being "electrically connected to" another part with another element therebetween. Further, when a certain part is indicated as "including" or "comprising" a certain element, it is to be understood as further including a presence or a possibility of another element and not precluding the presence or the possibility of another element, unless otherwise specified.

In this disclosure, the term "the" and similar infinitive makers as used in the claims, may be directed to both the singular and the plural. Moreover, unless a recitation explicitly specifies the order of operations describing a method according to the disclosure, the described operations can be performed in a suitable order. The disclosure is not limited according to the order of the operations of the operations described The phrases "in some embodiments" or "in one embodiment" which appear in various places in the disclosure do not all refer to the same embodiment necessarily.

Some embodiments of the disclosure may be represented by functional block configurations and various processing operations. Some or all of these functional blocks may be implemented in various numbers of hardware and/or software configurations that perform particular functions. For example, the functional blocks of the disclosure can be implemented by one or more microprocessors, or can be implemented by circuit configurations for a given function. In addition, for example, the functional blocks of the disclosure can be implemented in various programming or scripting languages. The functional blocks can be implemented as an algorithm executed in one or more processors. Further, the disclosure can employ techniques for electronic environment setting, signal processing, and/or data processing of the related art. The terms "mechanism," "element," "means," and "configuration" can be used broadly, and are not limited to mechanical and physical configurations.

In addition, the connection lines or connecting members between the elements shown in the drawings are functional connections and/or physical or circuit connections. In an actual device, connection among elements may be represented by various functional connection, physical connection, or circuitry connection which are added or may be replaced.

The disclosure will be described in greater detail below with reference to the accompanying drawings.

FIG. 1A is a diagram illustrating a situation in which a content recommendation system executes a function by using a user command input to a display device according to an embodiment.

Referring to FIG. 1A, the content recommendation system 1 may include a display device 10, a refrigerator 20, or a server 40. However, the content recommendation system 1 is not limited by the elements comprising thereof, and an element required for operating the content recommendation system 1 may be further included or one of the elements may be excluded.

The display device 10, the refrigerator 20, and the server 40 may perform communication directly by using a communicator included in each device.

According to an embodiment, a display device 10, a refrigerator 20, and a server 40 may established a communication network by using a wired or wireless communication method. The display device 10, the refrigerator 20, and the server 40 may include a wireless communicator (e.g., cellular communication module, a short range wireless communication module or a global navigation satellite system (GNSS) communication module) or a wired communicator (e.g., local area network (LAN) communication module, or a power line communication module), and may communicate with an external electronic device through a first network (e.g., a short range communication network such as Bluetooth, Wi-Fi direct or infrared data association (IrDA)) or a second network (e.g., a long range communication network such as cellular network, internet or a computer network (e.g., LAN or wide area network (WAN))) by using the corresponding communicator thereof. The display device 10, the refrigerator 20, and the server 40 may be implemented into one chip or may each include a communicator implemented as separate chips.

According to an embodiment, the display device 10 may be an image displaying device (e.g., a television (TV)) which is capable of processing an image signal received from the outside and visually displaying the processed image, but the embodiment is not limited thereto, and may be implemented with a device including a memory and a processor. For example, the display device 10 may be implemented as various image displaying devices such as a mobile phone, a smartphone, a tablet personal computer (PC), a digital camera, a camcorder, a notebook computer (e.g., laptop computer), a tablet PC, a desktop, an e-book terminal, a digital broadcasting terminal, a personal digital assistant (PDA), a portable multimedia player (PMP), an MP3 player, a wearable device, or the like. In addition, the display device 10 may be implemented to a fixed-type or a portable-type, and may be a digital broadcast receiver capable of receiving digital broadcast.

According to an embodiment, the display device 10 may provide a service which is necessary to a user through an application (or, application program) (e.g., a notification application, a photo (gallery) application, etc.) stored inside the display device 10.

According to an embodiment, the server 40 may receive a voice input of a user from the display device 10 or other devices (e.g., artificial intelligence speaker, etc.) connected through the communication network and change to a text data. According to various embodiments, the server 40 may generate (or select) an instruction executing at least one or more functions based on the text data. The instruction may include information on an operation (or process) for executing at least one function or information on a parameter for executing the operation. The instruction may include an order of an operation for executing at least one function. The display 10 may receive an instruction generated by the server 40, select an application (or function) according to the instruction, and execute an operation based on the instruction in the selected application.

According to various embodiments, the server 40 may be comprised on a plurality of servers including a first server and a second server. For example, the first server may be a server storing media content, and the second server may be a server performing a function related to voice recognition. However, the embodiment is not limited thereto. For example, the server 40 may perform all functions related to the function of storing media content and voice recognition.

According to an embodiment, the refrigerator 20 may be a home appliance device, which includes a storage for storing food products and a cool air supply device for supplying cool air to the storage, and is capable of storing fresh food products. The refrigerator 20 may further include a camera. According to an embodiment, the refrigerator 20 may obtain an image by photographing food products stored in the storage using a camera.

A method of using a content recommendation system 1 according to an embodiment will be described below.

In operation ①, the display device 10 may receive a user history (e.g., utterance) requesting information related to the refrigerator. For example, the display device 10 may use a microphone (not shown) included in the display device 10 to receive user input requesting information related to the refrigerator.

The user input requesting information related to the refrigerator may be at least one of, for example, "display broadcast related to food ingredients in the refrigerator," "what kind of food can be made with the ingredients in the refrigerator?" or "what is currently in the refrigerator?" However, the user input is not limited thereto, and may include various user input requesting information related to the refrigerator.

According to an embodiment, the display device 10 may transfer the user utterance to the server 40.

In operation ②, the server recognize a user utterance by using a voice recognition algorithm (or, voice recognition module), and perform a function related to the recognized utterance. The function related to the recognized utterance may, for example, be a function recommending a broadcast content on cooking related to the ingredients stored in the refrigerator 20.

According to various embodiments, the server 40 may use an artificial intelligence algorithm which performs voice recognition to recognize user utterance, and perform a function related to the utterance. For example, the server 40 may recognize content included in the utterance of the user using the voice and a result of having recognizing the voice and applying the user utterance to a trained data recognition model.

In operation ③, the server 40 may, based on the result of utterance recognition, use the camera included in the refrigerator 20 to transmit an instruction requesting the transmission of the obtained image to the refrigerator 20.

In operation ④, the refrigerator 20 may, in response to the received request instruction, use the camera included in the refrigerator 20 to obtain at least one image. For example, the refrigerator 20 may use a plurality of cameras capable of photographing the interior of the refrigerator 20 to obtain at least one image.

In operation ⑤, the server 40 may receive at least one image obtained by the refrigerator 20.

According to various embodiments, the server 40 may be pre-stored with photographed images of a storage of the refrigerator 20. In this case, the server 40 may omit the above-described operations ③ to ⑤.

In operation ⑥, the server may recognize the food ingredients included in the image received from the refrigerator 20 and obtain a first information (e.g., first text) related to a name of the food ingredient.

According to an embodiment, the server 40 may recognize an object (e.g., food ingredient) included in the image. The server 40 may, for example, change the image to an image emphasizing an edge area, and recognize the shape of the object by analyzing the shape of the edge.

According to an embodiment, the server 40 may identify the name of the recognized object and obtain a first text related to the name of the food ingredient.

According to various embodiments, the server obtain the first text related to the name of the ingredient by recognizing the food ingredient included in the image using the artificial intelligence algorithm. For example, the server 40 may obtain the first text related to the name of the food ingredient by applying at least one image which photographed the interior of the refrigerator 20 to the trained data recognition model using the image including the object and the name of the object as learning data.

According to an embodiment, the server 40 may generate a broadcast content on cooking by using the first information (e.g., first text) and a second information (e.g., second text) related to cooking information recognized from the media content by the server 40.

According to an embodiment, the server 40 may recognize cooking information in the media content stored in the server 40 in the text form. For example, the server 40 may recognize text by applying a text recognition method (e.g., optical character reader (OCR) technology) to the respective image frames included in the media content of a moving image form. The server 40 may identify at least one image frame related to the cooking information (e.g., name or cooking method of a food ingredient, etc.) of the media content, and obtain a second text related to the cooking information by using the text included in the image frame. The second text may be generated in plurality according to the number of media content stored by the server 40.

According to various embodiments, the server 40 may distinguish an image frame related to cooking information and an image frame not related to cooking information of a plurality of image frames included in the media content of a moving image form. The image frame related to cooking information may, for example, be an image frame with characters including a food ingredient, a cooking method, and the like in a text recognition result text.

According to an embodiment, the server 40 may use the first text related to the name of the food ingredient and the second text related to the cooking information to obtain the broadcast content on cooking to be transmitted to the display device 10 of the media content.

For example, the server 40 may identify a second text which includes a name identical or similar to the name of the food ingredient included in the first text of a plurality of second texts. The server 40 may obtain (or, add) a media content corresponding to the identified at least one or more second texts as the broadcast content on cooking.

According to various embodiments, the server 40 may obtain a media content viewed by a third party which includes the same or similar food ingredients with the food ingredient included in the first text. The server 40 may identify a second text which includes a name identical or similar to the name of the food ingredient included in the first text of the second texts corresponding to the obtained media content. The server 40 may obtain a media content corresponding to the identified at least one or more second texts as the broadcast content on cooking.

According to various embodiments, the server 40 may obtain a media content which is most played back during a certain period (e.g., recent 3 months, 6 months, or 1 year). The server 40 may identify a second text which includes a name identical or similar to the name of the food ingredient included in the first text of the second texts corresponding to the obtained media content. The server 40 may obtain the media content corresponding to the identified at least one or more second texts as the broadcast content on cooking.

In operation ⑦, the server 40 may transmit at least one of the second text related to the obtained broadcast content on cooking and cooking information to the display device 10.

In operation ⑧, the display device 10 may display the received broadcast content on cooking with the image including the food ingredient.

According to an embodiment, the display device 10 may divide a display area 11 into two areas, and display an image 110 including a food ingredient in a first area and display a broadcast content on cooking 120 in a second area. The display device 10 may, based on the broadcast content on cooking 120 being in plurality, display the broadcast content on cooking 120 in a list form. However, the method of displaying the broadcast content on cooking 120 and the image 110 including the food ingredient by the display device 10 is not limited thereto.

According to various embodiments, the display device 10 may display the received second text with the image including the food ingredient. In addition, the display device 10 may obtain only a content on a cooking process in the second text and display with the image including the food ingredient.

Accordingly, the content recommendation system 1 according to an embodiment may recognize a user utterance related to the refrigerator, and provide cooking related content necessary to the user.

Figure 1B:
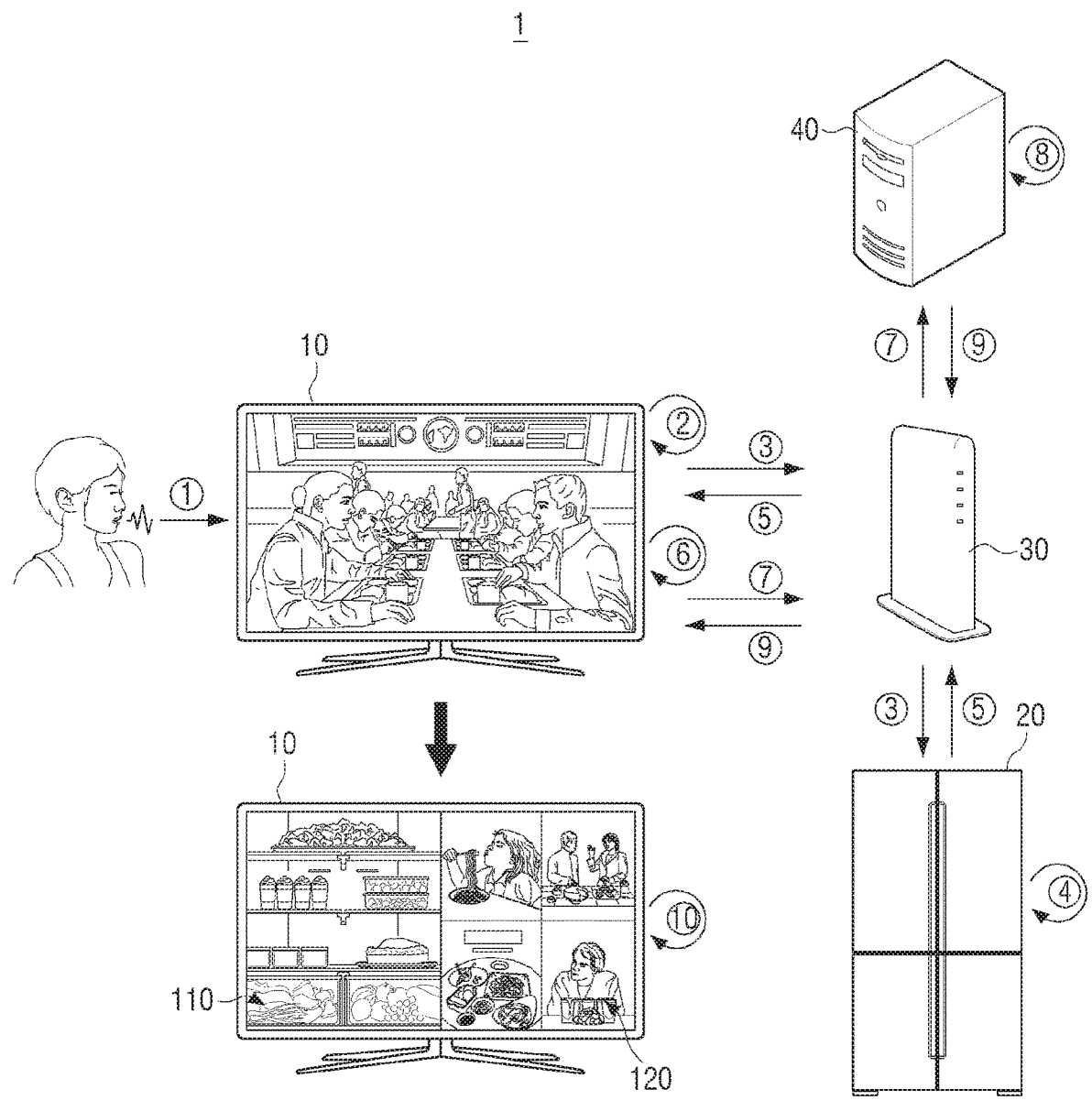
FIG. 1B is a diagram illustrating a situation in which a content recommendation system executes a function by using a user command input to a display device according to an embodiment.

FIG. 1B is a diagram illustrating a situation in which a content recommendation system executes a function by using a user command input to a display device according to an embodiment.

Referring to FIG. 1B, the content recommendation system 1 may include a display device 10, a server 40, a refrigerator 20, or a home gateway 30. However, the elements comprising the content recommendation system 1 is not limited thereto, and an element required for an operation of the content recommendation system 1 may be added or one of the elements may be excluded.

According to an embodiment, the display device 10, the server 40, the refrigerator 20, or the home gateway 30 may all be connected through the communication network. For example, the display device 10 and the refrigerator 20 may be connected with the home gateway 30 through the communication network, and the home gateway 30 may be connected with the server 40 through the communication network. However, the connection structure through the communication network is not limited thereto, and may be comprised of various structures.

According to an embodiment, the display device 10, the refrigerator 20, the server 40, or a home gateway 30 may established a communication network by using a wired or wireless communication method. The display device 10, the refrigerator 20, the server 40, or the home gateway 30 may include a wireless communicator (e.g., cellular communication module, a short range wireless communication module or a GNSS communication module) or a wired communicator (e.g., LAN communication module, or a power line communication module), and may communicate with an external electronic device through a first network (e.g., a short range communication network such as Bluetooth, Wi-Fi direct or IrDA) or a second network (e.g., a long range communication network such as cellular network, internet or a computer network (e.g., LAN or WAN)) by using the corresponding communicator thereof. The display device 10, the refrigerator 20, the server 40 or the home gateway 30 may be implemented into one chip or may each include a communicator implemented as separate chips.

According to an embodiment, the display device 10 may receive a user utterance by a user input. The display device 10 may receive the user utterance, and generate an instruction operating an application based on the user utterance. For example, the display device 10 may receive the user utterance and change to a text data. According to various embodiments, the display device 10 may generate (or, select) an instruction executing at least one or more functions based on the text data. The instruction may include information on an operation (or, process) for executing the ast least one function or information on a parameter for executing the operation. The instruction may include an order of the operations for executing the at least one function. The display device 10 may select an application (or, function) according to the instruction, and execute an operation according to the instruction in the selected application.

According to an embodiment, the server 40 or the home gateway 30 may receive voice input of the user from the display device 10 or other devices (e.g., artificial intelligence speaker, etc.) through the communication network and change to text data. According to various embodiments, the server 40 or the home gateway 30 may generate (or, select) an instruction executing at least one or more functions based on the text data. The instruction may include information on an operation (or process) for executing at least one function or information on a parameter for executing the operation. The instruction may include an order of operation for executing at least one function. The display 10 may receive an instruction generated by the server 40 or the home gateway 30, select an application (or function) according to the instruction, and execute an operation based on the instruction in the selected application.

The method of using the content recommendation system 1 according to various embodiments will be described below.

In operation ①, the display device 10 may receive a user input (e.g., utterance) requesting information related to the refrigerator. For example, the display device 10 may use a microphone (not shown) included in the display device 10 to receive user input requesting information related to the refrigerator.

The user input requesting information related to the refrigerator may be at least one of, for example, "display broadcast related to food ingredients in the refrigerator," "what kind of food can be made with the ingredients in the refrigerator?" or "what is currently in the refrigerator?" However, the user input is not limited thereto, and may include various user input requesting information related to the refrigerator.

In operation ②, the display device 10 may recognize the user utterance by using an internally stored voice recognition algorithm (or, voice recognition module), and perform a function related to the recognized utterance. The function related to the recognized utterance may, for example, be a function recommending a broadcast content on cooking related to the ingredients stored in the refrigerator 20.

In operation ③, based on the result of utterance recognition, the display device 10 may transmit a request instruction requesting the transmission of an image obtained by using the camera included in the refrigerator 20 to the refrigerator 20.

According to an embodiment, the display device 10 may transmit a request instruction requesting the transmission of the image to the refrigerator 20 by using the home gateway 30.

According to various embodiments, the display device 10 may transmit the utterance input of the user to the home gateway 30, and the home gateway 30 may recognize the utterance input of the user by using the voice recognition algorithm and the like, and perform an operation after receiving the instructions generated for performing functions related to the recognized utterances.

According to various embodiments, a request instruction requesting the transmission of an image may be transmitted to the refrigerator 20 by using instructions related to the recognized utterances by the home gateway 30.

In operation ④, the refrigerator 20 may, in response to the received request instruction, obtain at least one image by using the camera included in the refrigerator 20. For example, the refrigerator 20 may use a plurality of cameras capable of photographing the inside of the refrigerator 20 to obtain at least one image.

In operation ⑤, the display device 10 may receive at least one or more images obtained by the refrigerator 20 through the home gateway 30.

According to various embodiments, the display device 10 may be pre-stored with photographed images of the storage of the refrigerator 20. In this case, the display device 10 may omit the above-described operations ③ to ⑤.

In operation ⑥, the display device 10 may obtain a first information (e.g., first text) related to a name of a food ingredient by recognizing the food ingredient included in the image received from the refrigerator 20.

According to an embodiment, the display device 10 may recognize an object (e.g., food ingredient) included in the image. The display device 10 may, for example, recognize a shape of the object by analyzing the shape of an edge area after changing the image to an image emphasizing an edge area.

According to an embodiment, the display device 10 may identify the name of the recognized object and obtain a first text related to the name of the food ingredient.

According to various embodiments, the display device 10 may use the artificial intelligence algorithm to recognize the food ingredient included in the image and obtain the first text related to the name of the food ingredient. For example, the display device 10 may obtain a first text related to the name of the food ingredient by using the image including the object and the name of the object as learning data and applying at least one photographed image of the inside of the refrigerator 20 to the trained data recognition model.

In operation ⑦, the display device 10 may transmit the obtained first text to the server 40 through the home gateway 30.

In operation ⑧, the server 40 may generate a broadcast content on cooking by using a first information (e.g., first text) and a second information (e.g., second text) related to the cooking information recognized from the media content by the server 40.

According to an embodiment, the server 40 may recognize cooking information in the media content stored in the server 40 in the text form. For example, the server 40 may recognize text by applying a text recognition method (e.g., optical character reader (OCR) technology) to the respective image frames included in the media content of a moving image form. The server 40 may identify at least one image frame related to the cooking information (e.g., name or cooking method of a food ingredient, etc.) of the media content, and obtain a second text related to the cooking information by using the text included in the image frame. The second text may be generated in plurality according to the number of media content stored by the server 40.

According to various embodiments, the server 40 may distinguish an image frame related to cooking information and an image frame not related to cooking information of the plurality of image frames included in the media content of a moving image form. The image frame related to cooking information may, for example, be an image frame with characters including a food ingredient, a cooking method, and the like in the text recognition result text.

According to an embodiment, the server 40 may use the first text related to the name of the food ingredient and the second text related to the cooking information to obtain the broadcast content on cooking to be transmitted to the display device 10 of the media content.

For example, the server 40 may identify a second text which includes a name identical or similar to the name of the food ingredient included in the first text of a plurality of second texts. The server 40 may obtain (or, add) the media content corresponding to the identified at least one or more second texts as the broadcast content on cooking.

According to various embodiments, the server 40 may obtain a media content viewed by a third party which includes the same or similar food ingredients with the food ingredient included in the first text. The server 40 may identify a second text which includes a name identical or similar to the name of the food ingredient included in the first text of the second texts corresponding to the obtained media content. The server 40 may obtain the media content corresponding to the identified at least one or more second texts as the broadcast content on cooking.

According to various embodiments, the server 40 may obtain the media content which is most played back during a certain period (e.g., recent 3 months, 6 months, or 1 year). The server 40 may identify the second text which includes a name identical or similar to the name of the food ingredient included in the first text of the second texts corresponding to the obtained media content. The server 40 may obtain the media content corresponding to the identified at least one or more second texts as the broadcast content on cooking.

In operation ⑨, the display device 10 may receive at least one of the second text related to the cooking information obtained by the server 40 and the broadcast content on cooking obtained by the server 40 through the home gateway 30.

In operation ⑩, the display device 10 may display the received broadcast content on cooking with the image including the food ingredient.

According to an embodiment, the display device 10 may divide the display area 11 into two areas, and display an image 110 including the food ingredient in the first area and display a broadcast content on cooking 120 in the second area. The display device 10 may, based on the broadcast content on cooking 120 being in plurality, display the broadcast content on cooking 120 in the list form. However, the method of displaying the broadcast content on cooking 120 and the image 110 including the food ingredient by the display device 10 is not limited thereto.

Accordingly, by using the content recommendation system 1 according to an embodiment, the display device 10 may recognize user utterance related to the refrigerator, and provide content related to cooking necessary to the user.

Figure 2:
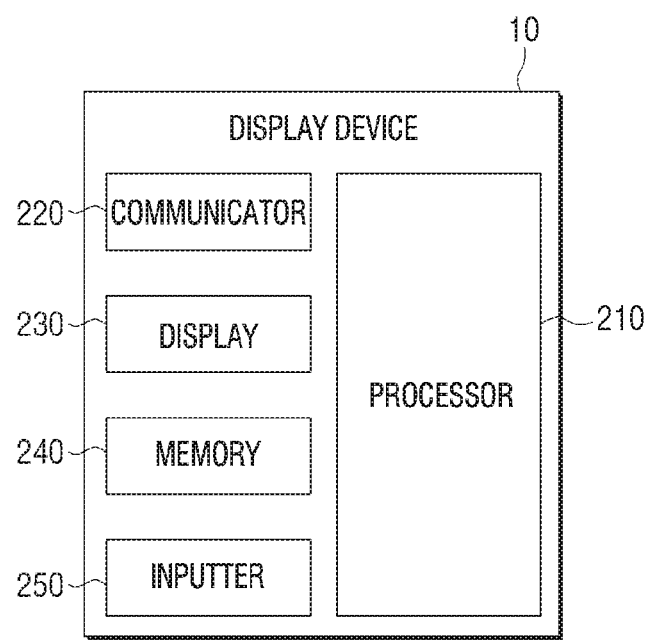
FIG. 2 is a schematic block diagram of a display device according to an embodiment.

FIG. 2 is a schematic block diagram of a display device according to an embodiment.

Referring to FIG. 2, the display device 10 may include a processor 210, a communicator 220, a display 230, an inputter 250, and a memory 240. However, the embodiment is not limited thereto. For example, the display device 10 may further include an element, or some elements may not be included.

According to an embodiment, the processor 210 may control the overall operation of the display device 10. For example, the processor 210 may control the inputter 250 to receive the user input. The processor 210 may control the display 230 to display an image. The processor 210 may control the memory 240*h* to execute a program stored in the memory 240, and may call or store necessary information.

According to an embodiment, the processor 210 may be configured to, based on an input requesting information related to the refrigerator 20 being received, control the communicator 220 for a request instruction requesting the transmission of the obtained image to be transmitted to the refrigerator by using the camera located inside the refrigerator 20.

According to an embodiment, the processor 210 may receive at least one image from the refrigerator 20, and obtain a first text related to the name of the food ingredient by recognizing the food ingredient included in the at least one image.

According to an embodiment, the processor 210 may be configured to control the communicator 220 to transmit the first text to the server 40, and receive the broadcast content on cooking obtained by using the second text related to the cooking information recognized from the first text and the media content by the server 40.

According to an embodiment, the processor 210 may be configured to control the display 230 and may display the broadcast content on cooking with the image including the food ingredient.

According to an embodiment, the display 230 may display an execution screen of an image or video, and/or an application.

According to an embodiment, the display 230 may, based on the control of the processor 210, display an image received from the refrigerator 20, a content list received from the server 40, and the like.

According to an embodiment, the communicator 220 may connect the display device 10 with the external device by control of the processor 210. The communicator 220 may include one of the elements which implement the various wired or wireless communication methods such as a wireless LAN, Bluetooth, and a wired Ethernet corresponding to the function and structure of the display device 10.

According to one embodiment, the memory 240 may include at least one type of storing medium among a memory of a flash memory type, a hard disk type, a multimedia card micro type, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, or an optical disk.

According to an embodiment, the memory 240 may store instructions set for the processor 210 to, based on an input requesting information related to a refrigerator 20 being received, control the communicator 220 for a request instruction requesting a transmission of an image obtained by using the camera positioned in the refrigerator to be transmitted to the refrigerator, receive at least one image from the refrigerator 20, obtain a first text related to a name of a food ingredient by recognizing the food ingredient included in the at least one image, control the communicator 220 to transmit the first text to the server 40, receive a broadcast content on cooking obtained by using the first text and a second text related to a cooking information recognized from a media content, and control the display 230 to display the broadcast content on cooking along with the image including a food ingredient.

According to an embodiment, the inputter 250 may receive a user input from the user. For example, the inputter 250 may receive user input from a connected external device (e.g., keyboard, headset, etc.). The inputter 250 may include a microphone capable of receiving a user utterance as voice signal.

FIG. 3 are diagrams illustrating another method of displaying an image including a food ingredient with a broadcast content on cooking by a display device according to an embodiment.

Figure 3A:
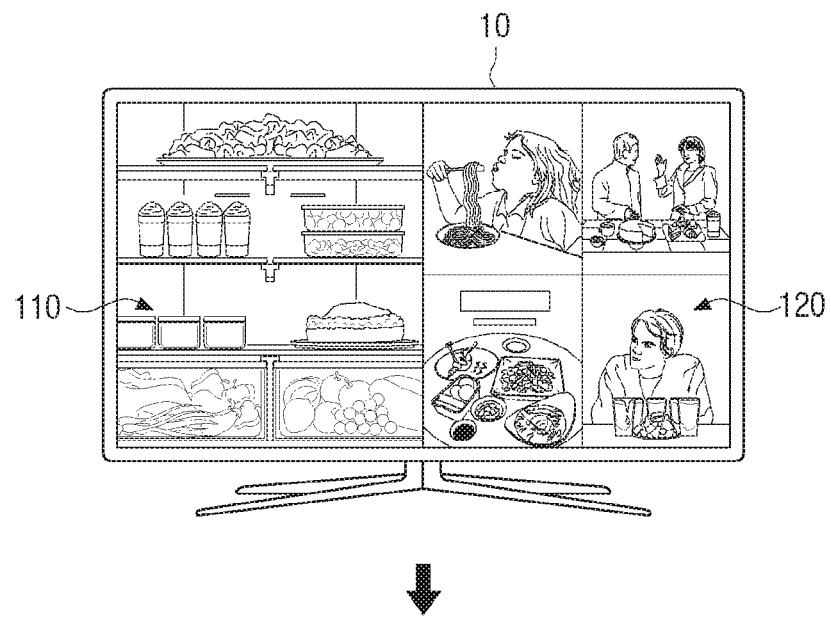
FIGS. 3A and 3B are diagrams illustrating another method of displaying an image including a food ingredient with a list of broadcast content on cooking by a display device according to an embodiment.

Referring to FIG. 3A, the display device 10 may display the broadcast content on cooking with the image including the food ingredient together.

According to an embodiment, the display device 10 may divide the display area 11 into two areas, and display an image 110 including the food ingredient in the first area and display a broadcast content on cooking 120 in the second area. The display device 10 may, based on the broadcast content on cooking 120 being in plurality, display the broadcast content on cooking 120 in the list form. According to various embodiments, the display device 10 may interchange the position to which the image 110 including the food ingredient is displayed and the position to which the broadcast content on cooking 120 is displayed.

Figure 3B:
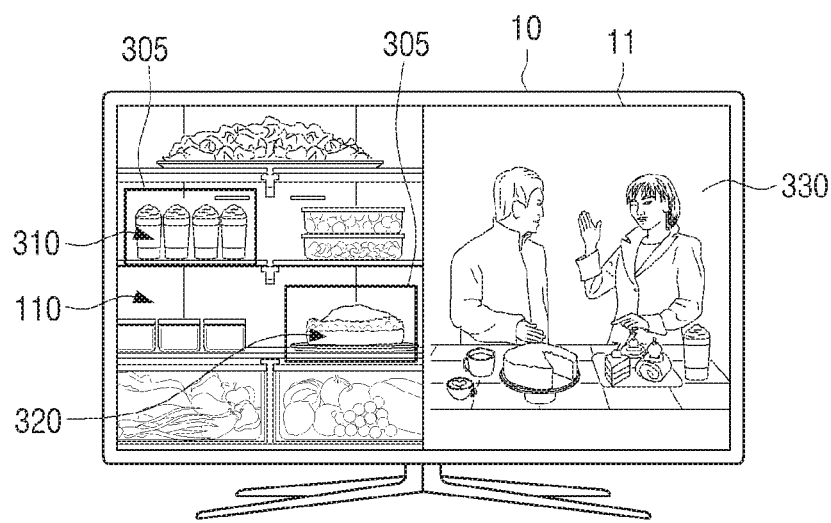

Referring to FIG. 3B, the display device 10 may display the selected broadcast content on cooking with the food ingredient corresponding thereto by distinguishing from other food ingredients.

According to an embodiment, the display device 10 may receive an input selecting the displayed broadcast content on cooking. For example, the display device 10 may receive user input selecting the broadcast content on cooking through a control device (e.g., remote control, smart phone, etc.). According to various embodiments, the display device 10 may receive a user utterance selecting the broadcast content on cooking. The display device 10 may recognize the user utterance, and select the content based on the recognized result.

For example, the display device 10 may enlarge and display a selected content 330 in an area in which the broadcast content on cooking 120 is displayed of the display area 11.

According to an embodiment, the display device 10 may identify a recipe with the selected content included or the name of the food ingredient. The display device 10 may distinguish and display an object corresponding to the recipe included in the selected content or the name of the food ingredient from other objects among the objects included in the image 110 received from the refrigerator 20.

For example, the display device 10 may compare the second text corresponding to the selected content with the first text including the name of the food ingredient. The display device 10 may identify the name of the food ingredient included in both the first text and the second text. The display device 10 may identify the object corresponding to the name of the identified food ingredient and display the identified object by distinguishing from other objects.

According to an embodiment, the display device 10 may use a box display 305 to display by distinguishing the food ingredients 310 and 320 corresponding to the name of the identified food ingredient from other food ingredients. However, the embodiment is not limited thereto. For example, the display device 10 may use a symbol (e.g., circle shape, star shape, arrow, etc.) to display by distinguishing the food ingredients 310 and 320 corresponding to the name of the identified food ingredient.

According to various embodiments, the display device 10 may, when displaying by distinguishing the food ingredients 310 and 320 corresponding to the name of the identified food ingredient from other food ingredients as described above, concurrently or sequentially output the names of the identified food ingredients 310 and 320 by using a speaker, and the like.

According to various embodiments, the display device 10 may, based on one content being selected by the user, display by distinguishing the selected content from other content without displaying by enlarging the selected content as in FIG. 3B, and only displaying the broadcast content on cooking in the list form. In this case, the display device 10 may display various effects such as an arrow and a dotted line between the selected content and the identified food ingredients 310 and 320. In addition, according to various embodiments, the display device 10 may display the remaining broadcast content on cooking, excluding the selected broadcast content on cooking, in a blurred manner.

However, the embodiment is not limited thereto. The display device 10 may use various methods to display by distinguishing the remaining broadcast content on cooking, excluding the selected broadcast content on cooking and the selected content.

FIG. 4 are diagrams illustrating a situation in which a display device displays a user interface proceeding with a purchase of a food ingredient.

Figure 4A:
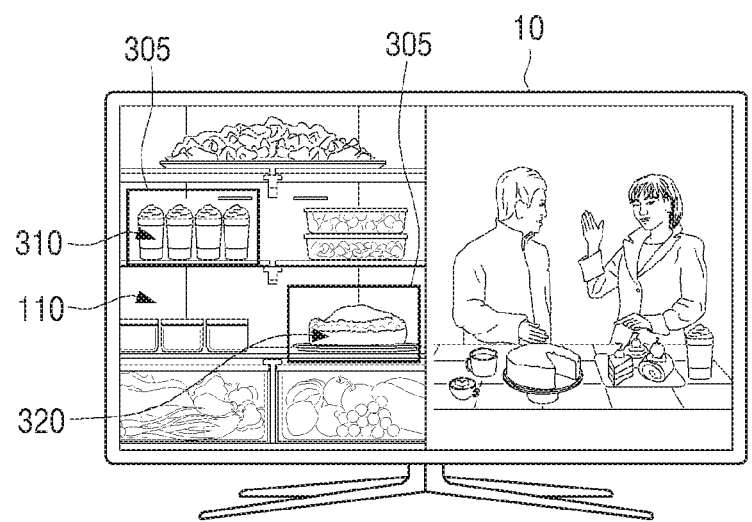
FIGS. 4A, 4B, and 4C are diagrams illustrating a situation in which a display device displays a user interface proceeding with a purchase of a food ingredient.

Referring to FIG. 4A, the display device 10 may display the selected broadcast content on cooking with a food ingredient corresponding thereto by distinguishing from other food ingredients.

According to an embodiment, the display device 10 may use the box display 305 to display by distinguishing the food ingredients 310 and 320 corresponding to the name of the identified food ingredients from other food ingredients. However, the embodiment is not limited thereto. For example, the display device 10 may use a symbol (e.g., circle shape, star shape, arrow, etc.) to display food ingredients 310 and 320 corresponding to the names of the identified food ingredients.

Figure 4B:
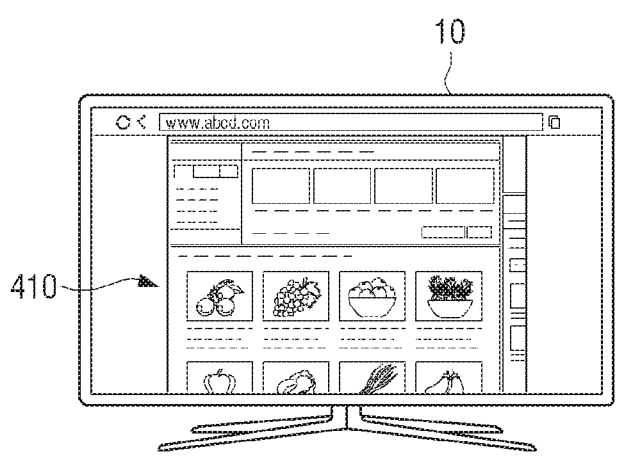

Referring to FIG. 4B, the display device 10 may display a user interface 410 capable of purchasing a food ingredient corresponding to the selected broadcast content on cooking.

According to an embodiment, the display device 10 may identify a cooking method corresponding to the selected broadcast content on cooking. For example, the display device 10 may identify a content corresponding to the cooking method in the second text corresponding to the selected broadcast content on cooking.

According to an embodiment, the display device 10 may identify the names of the food ingredients included in the identified cooking method. The display device 10 may compare the names of the identified food ingredients with the name of the food ingredient included in the first text, and identify the food ingredient that is not included in the first text but included in the cooking method. The display device 10 may determine the food ingredient not included in the first text but included in the cooking method as the food ingredient requiring purchase.

According to an embodiment, the display device 10 may display a user interface 410 capable of purchasing a food ingredient for purchasing the food ingredient requiring purchase. For example, the display device 10 may connect to the food ingredient shopping website, and display a searched result on the food ingredient requiring purchase.

Figure 4C:
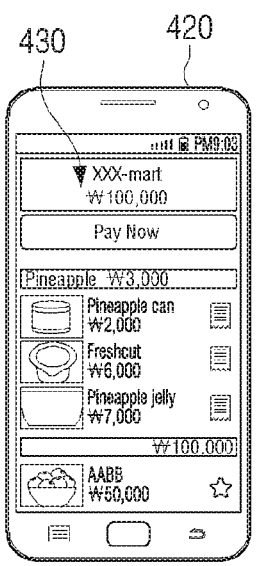

Referring to FIG. 4C, the display device 10 may transfer information on a food ingredient requiring purchase to an external electronic device 420.

According to an embodiment, the display device 10 may identify the cooking method corresponding to the selected broadcast content on cooking. For example, the display device 10 may identify the content corresponding to the cooking method in the second text corresponding to the selected broadcast content on cooking.

According to an embodiment, the display device 10 may identify the names of the food ingredients included in the identified cooking method. The display device 10 may compare the names of the identified food ingredients with the name of the food ingredient included in the first text, and identify the food ingredient not included in the first text but included in the cooking method. The display device 10 may determine the food ingredient not included in the first text but included in the cooking method as a food ingredient requiring purchase.

According to an embodiment, the display device 10 may transmit information on the food ingredient requiring purchase and the user interface address (e.g., uniform resource locator (URL)) capable of purchasing food ingredients to the external electronic device 420. For example, the display device 10 may transmit the food ingredient shopping website address and the information on the food ingredient requiring purchase to the external electronic device 420 (e.g., smart phone, tablet PC, wearable device, etc.) connected in communication with the display device 10.

The external electronic device 420 may use the received URL of the food ingredient shopping website and information on the food ingredient requiring purchase to connect to the food ingredient shopping website 430, and display the searched result on the food ingredients requiring purchase.

According to various embodiments, the server 40 may identify the names of the food ingredients included in the identified cooking method. The server 40 may compare the names of the identified food ingredients with the name of the food ingredient included in the first text, and identify the food ingredient not included in the first text but included in the cooking method. The server 40 may determine the food ingredient not included in the first text but included in the cooking method as the food ingredient requiring purchase.

According to an embodiment, the server 40 may transmit information on the food ingredient requiring purchase and the address of the user interface (e.g., uniform resource locator (URL)) capable of purchasing the food ingredient to the external electronic device 420. For example, the display device 10 may transmit the address of the food ingredient shopping website and information on the food ingredient requiring purchase to the external electronic device 420 (e.g., smart phone, tablet PC, wearable device, etc.) connected in communication with the display device 10.

The external electronic device 420 may use the received URL of the food ingredient shopping website and information on the food ingredient requiring purchase to connect to the food ingredient shopping website 430, and display the searched result on the food ingredients requiring purchase.

FIG. 5 are diagrams illustrating a method of playing back content on cooking information selected by an electronic device according to an embodiment.

Figure 5A:
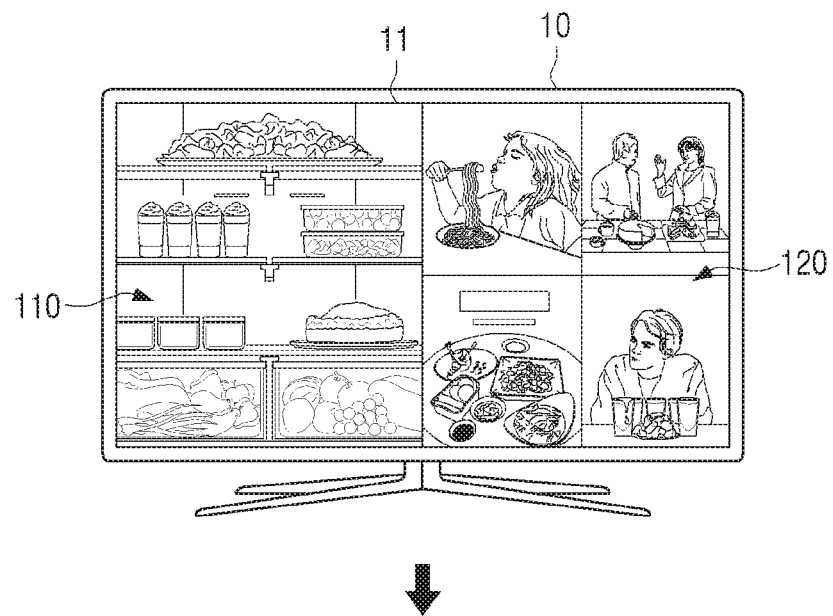
FIGS. 5A and 5B are diagrams illustrating a method of playing back content on cooking information selected by an electronic device according to an embodiment.

Referring to FIG. 5A, the display device 10 may also display an image 110 including a broadcast content on cooking 120 with a food ingredient.

According to an embodiment, the display device 10 may divide a display area 11 into two areas, and display an image 110 including a food ingredient in the first area and display a broadcast content on cooking 120 in the second area. According to various embodiments, the display device 10 may interchange the position to which the image 110 including the food ingredient is displayed and the position to which the broadcast content on cooking 120 is displayed.

Figure 5B:
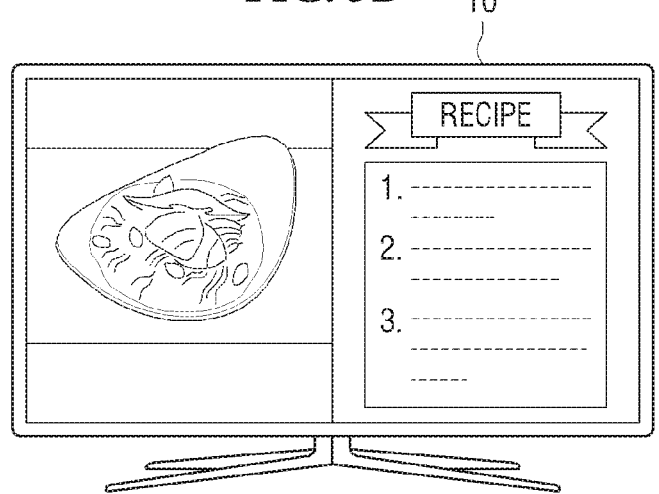

Referring to FIG. 5B, the display device 10 may, based on input selecting a content being received, playback the corresponding content.

According to an embodiment, the display device 10 may, as illustrated in FIG. 2, receive the broadcast content on cooking obtained by the server 40.

According to an embodiment, the server 40 may determine at least one image frame related to the cooking information (e.g., recipe, or name of the food ingredient, etc.) of the plurality of image frames comprising the media content pre-stored in the server 40. The server 40 may use a text included in the image frame related to the cooking information to obtain the second text including the cooking information.

According to an embodiment, the server 40 may obtain the broadcast content on cooking to be transmitted to an external device (e.g., display device 10 or refrigerator 20, etc.) by using at least one image frame related to the cooking information. For example, the server 40 may identify a frame related to the cooking information of the image frames included in the pre-stored media content, and generate a video clip comprised on image frames related to the cooking information. The video clip may, for example, refer to a collection of short still images corresponding to about 1 minute to 3 minutes or a moving image content.

According to an embodiment, the display device 10 may playback the selected video clip based on a user input selecting the video clip being received. In this case, because the video clip may be comprised only of image frames including cooking information, the user may only view the content which introduces the cooking information such as a recipe or food ingredients, without having to view the whole content of the broadcast content on cooking.

According to various embodiments, the server 40 may transmit a representative image frame on the obtained broadcast content to the display device 10. For example, the server 40 may transmit an image frame included with the broadcast title of the broadcast content on cooking. Accordingly, the user may select a preferred broadcast content by viewing the title of the broadcast content on cooking displayed in the display device 10.

According to various embodiments, as described above, when a view clip introducing a recipe or a food ingredient is viewed, the display device 10 may download and playback the whole content by using a method such as streaming from the server 40, based on a user input requesting the playback of the whole content of the selected video clip being received.

According to various embodiments, the server 40 may transmit all of the image frames comprising the obtained broadcast content on cooking to the display device 10. The display device 10 may analyze the image frames included in the received broadcast content on cooking through the OCR method, and the like, and identify the image frame including the recipe or the name of the food ingredient. The display device 10 may perform playback from the identified image frame. However, the embodiment is not limited thereto. For example, the display device 10 may playback the selected broadcast content on cooking from the beginning in response to the user input selecting the received broadcast content on cooking.

Figure 6:
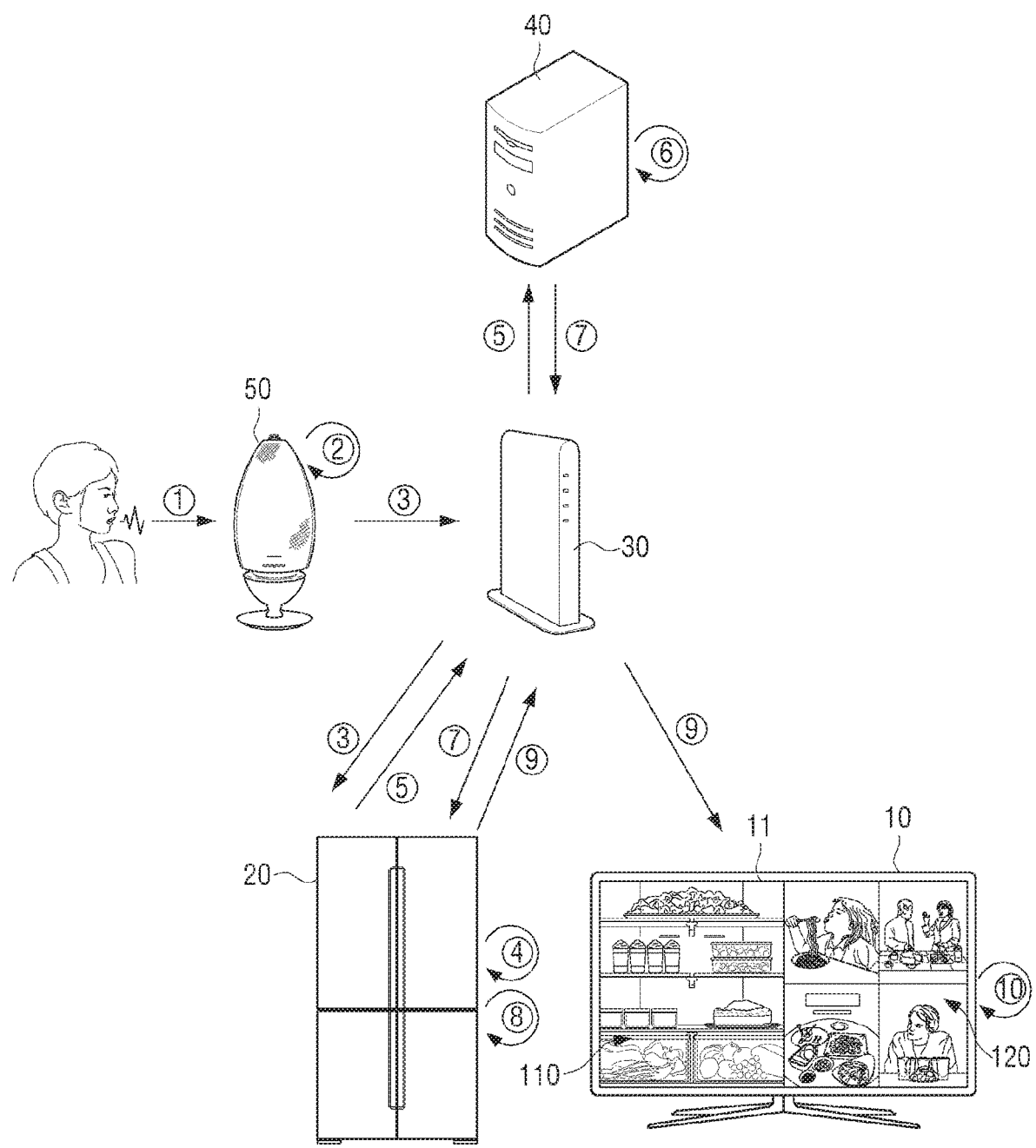
FIG. 6 is a diagram illustrating a situation in which a content recommendation system executes a function by using a user command input to a refrigerator.

FIG. 6 is a diagram illustrating a situation in which a content recommendation system executes a function by using a user command input to a refrigerator according to an embodiment.

Referring to FIG. 6, the content recommendation system 1 may include a display device 10, a server 40, a refrigerator 20, a home gateway 30, or an artificial intelligence speaker 50.

According to an embodiment, the display device 10, the server 40, the refrigerator 20, the artificial intelligence speaker 50 or the home gateway 30 may all be connected through the communication network. For example, the artificial intelligence speaker 50, the display device 10, and the refrigerator 20 may be connected to the home gateway 30 through the communication network, and the home gateway 30 may be connected to the server 40 through the communication network. However, the connection structure through the communication network is not limited thereto, and may be comprised of various structures.

For example, the artificial intelligence speaker 50, the display device 10, the refrigerator 20, and the server 40 may use the communicator included in each device to perform direct communication. The artificial intelligence speaker 50, the display device 10, and the refrigerator 20 has been described below as performing communication with the server 40 through the home gateway 30 to comprise the content recommendation system 1, but the embodiment is not limited thereto, and the artificial intelligence speaker 50, the display device 10, and the refrigerator 20 may perform direct communication with the server 40, and comprise the content recommendation system 1 by transmitting and receiving the necessary data or signal.

According to an embodiment, the artificial intelligence speaker 50 may receive a user utterance as a user input. The artificial intelligence speaker 50 may receive the user utterance, and generate an instruction operating an application based on the user utterance. For example, the artificial intelligence speaker 50 may receive the user utterance and change the received utterance to text data. According to various embodiments, the artificial intelligence speaker 50 may generate (or, select) an instruction executing at least one or more functions based on the text data. The instruction may include information on an operation (or, process) for executing at least one function or information on a parameter for executing the operation. The instruction may include an order of operation for executing at least one function. The artificial intelligence speaker 50 may select an application (or, function) according to the instruction, and may execute operations based on the instructions in the selected application.

In operation ①, the artificial intelligence speaker 50 may receive a user input (e.g., utterance) requesting information related to the refrigerator. For example, the artificial intelligence speaker 50 may use the microphone (not shown) included in the artificial intelligence speaker 50 to receive user input requesting information related to the refrigerator.

The user input requesting information related to the refrigerator may be at least one of, for example, "display broadcast related to food ingredients in the refrigerator," "what kind of food can be made with the ingredients in the refrigerator?" or "what is currently in the refrigerator?" However, the user input is not limited thereto, and may include various user input requesting information related to the refrigerator.

In operation ②, the artificial intelligence speaker 50 may recognize the user utterance by using the internally stored voice recognition algorithm (or, voice recognition module), and generate an instruction for performing the function related to the recognized utterance. The instruction for performing the function related to the recognized utterance may, for example, be a function recommending a broadcast content on cooking related to the ingredients stored in the refrigerator 20.

In operation ③, based on the result of utterance recognition, the artificial intelligence speaker 50 may transmit the instruction generated based on the user utterance to the refrigerator 20 through the home gateway 30.

According to various embodiments, the artificial intelligence speaker 50 may transmit the utterance input of the user to the server 40 through the home gateway 30, and the server 40 may receive instructions generated to perform a function related to the recognized utterance by using the voice recognition algorithm, and the like, and recognizing the utterance input of the user. In this case, the artificial intelligence speaker 50 may perform operations thereafter such as requesting transmission of an image to the refrigerator 20, and the like, by using the received instructions.

In operation ④, the refrigerator 20 may, in response to the received instruction, obtain at least one image by using the camera included in the refrigerator 20. For example, the refrigerator 20 may obtain at least one image by using a plurality of cameras capable of photographing the inside of the refrigerator 20.

In operation ④, the refrigerator 20 may obtain the name of the food ingredient by recognizing the food ingredient included in the at least one image.

According to an embodiment, the refrigerator 20 may recognize an object (e.g., food ingredient) included in the image. The refrigerator 20 may, for example, recognize a shape of the object by analyzing the shape of an edge after changing the image to an image emphasizing the edge area.

According to an embodiment, the refrigerator 20 may identify the name of the recognized object and obtain the first information (e.g., first text) related to the name of the food ingredient.

In operation ⑤, the refrigerator 20 may transmit the obtained first text to the server 40 through the home gateway 30.

In operation ⑥, the server 40 may generate the broadcast content on cooking by using the first text and a second information (e.g., second text) related to the cooking information recognized from the media content by the server 40.

According to an embodiment, the server 40 may recognize cooking information in the media content stored in the server 40 in the text form. For example, the server 40 may recognize text by applying a text recognition method (e.g., optical character reader (OCR) technology) to the respective image frames included in the media content of a moving image form. The server 40 may identify at least one image frame related to the cooking information (e.g., name or cooking method of a food ingredient, etc.) of the media content, and obtain a second text related to the cooking information by using the text included in the image frame. The second text may be generated in plurality according to the number of media content stored by the server 40.

According to an embodiment, the server 40 may obtain a broadcast content on cooking to be transmitted to the display device 10 among the media content by using the first text with the name of the food ingredient included and the second text related to the cooking information.

For example, the server 40 may identify the second text which includes a name identical or similar to the name of the food ingredient included in the first text of a plurality of second texts. The server 40 may obtain (or, add) the broadcast content on cooking by using the media content corresponding to the identified at least one or more second texts.

According to various embodiments, the server 40 may obtain a media content viewed by a third party which includes the same or similar food ingredients with the food ingredient included in the first text. The server 40 may identify a second text which includes a name identical or similar to the name of the food ingredient included in the first text of the second texts corresponding to the obtained media content. The server 40 may obtain a media content corresponding to the identified at least one or more second texts as the broadcast content on cooking.

According to various embodiments, the server 40 may obtain a media content which is most played back during a certain period (e.g., recent 3 months, 6 months, or 1 year). The server 40 may identify a second text which includes a name identical or similar to the name of the food ingredient included in the first text of the second texts corresponding to the obtained media content. The server 40 may obtain the media content corresponding to the identified at least one or more second texts as the broadcast content on cooking.

In operation ⑦, the refrigerator 20 may receive at least one of the second text related to the cooking information obtained by the server or the broadcast content on cooking obtained by the server 40 through the home gateway 30.

According to various embodiments, the refrigerator 20 may transmit the obtained image to the server 40. The server 40 may obtain the first text from the image by using an object recognition algorithm, and the like, and receive the broadcast content on cooking which is obtained by using the first text.

In operation ⑧, the refrigerator 20 may generate the received broadcast content on cooking and the image including the food ingredient as one content.

In operation ⑨, the refrigerator 20 may transmit the content generated by using the broadcast content on cooking and the image including the food ingredient to the display device 10 through the home gateway 30.

In operation ⑩, the display device 10 may display the received broadcast content on cooking with the image including the food ingredient.

According to an embodiment, the display device 10 may divide the display area 11 into two areas, and display the image 110 including the food ingredient in the first area and display the broadcast content on cooking 120 in the second area. The display device 10 may, based on the broadcast content on cooking 120 being in plurality, display the broadcast content on cooking 120 in the list form. However, the method of displaying the broadcast content on cooking 120 and the image 110 including the food ingredient by the display device 10 is not limited thereto.

According to various embodiments, based on the refrigerator 20 transmitting the received broadcast content on cooking and the image including the food ingredient to the display device 10, the display device 10 may display the broadcast content on cooking with the image including the food ingredient.

Figure 7:
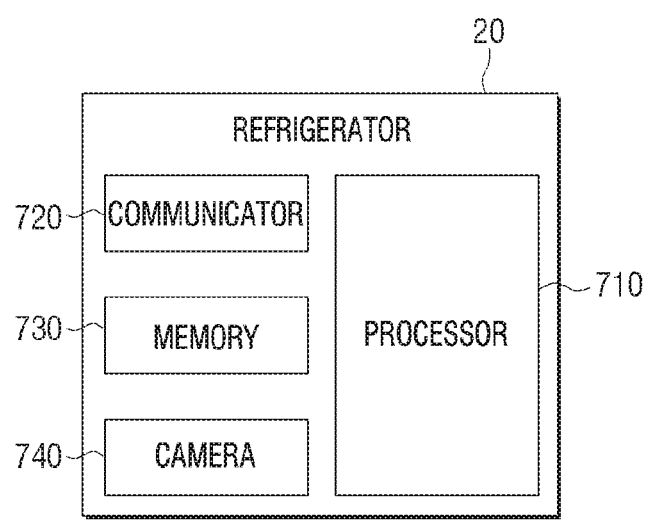
FIG. 7 is a schematic block diagram of a refrigerator according to an embodiment.

FIG. 7 is a schematic block diagram of a refrigerator according to an embodiment.

Referring to FIG. 7, the refrigerator 20 may include a processor 710, a communicator 720, a memory 730, and a camera 740. However, the embodiment is not limited thereto. For example, the refrigerator 20 may further include an element or may not include some elements.

According to an embodiment, the processor 710 may control the overall operation of the refrigerator 20. For example, the processor 710 may receive a user input through the communicator 720. The processor 710 may control the memory 730 to execute stored programs, and call or store necessary information.

According to an embodiment, the processor 710 may be configured to, based on an input requesting information related to the refrigerator 20 being received through the communicator 720, obtain at least one image by using the camera 740. The processor 710 may obtain the first text related to the name of the food ingredient by recognizing the food ingredient included in the at least one image.

According to an embodiment, the processor 710 may be configured to control the communicator 720 to transmit the first text to the server 40, and the server 40 may receive the obtained broadcast content on cooking by using the first text and the second text related to the cooking information recognized from the media content.

According to an embodiment, the processor 710 may generate the received broadcast content on cooking and the image including the food ingredient as one content, and transmit the generated content to the display device 10 through the home gateway 30.

According to an embodiment, the communicator 720 may connect the refrigerator 20 with the external device by the control of the processor 710. The communicator 720 may include one of the elements which implement the various wired or wireless communication methods such as a wireless LAN, Bluetooth, and a wired Ethernet corresponding to the function and structure of the refrigerator 20.

According to an embodiment, the memory 730 may store instructions set for the processor 710, based on an input requesting information related to the refrigerator being received, obtain at least one image by using the camera 740, obtain a first text related to a name of a food ingredient by recognizing the food ingredient included in the at least one image, control the communicator 720 to transmit the first text to the server 40, receive a broadcast content on cooking obtained by using the first text and the second text related the cooking information recognized from the media content by the server 40, control the communicator to transmit the broadcast content on cooking and the image to the display device 10.

According to an embodiment, the camera 740 may photograph the food ingredient stored inside the refrigerator 20 according to control by the processor 710 and generate an image.

Figure 8:
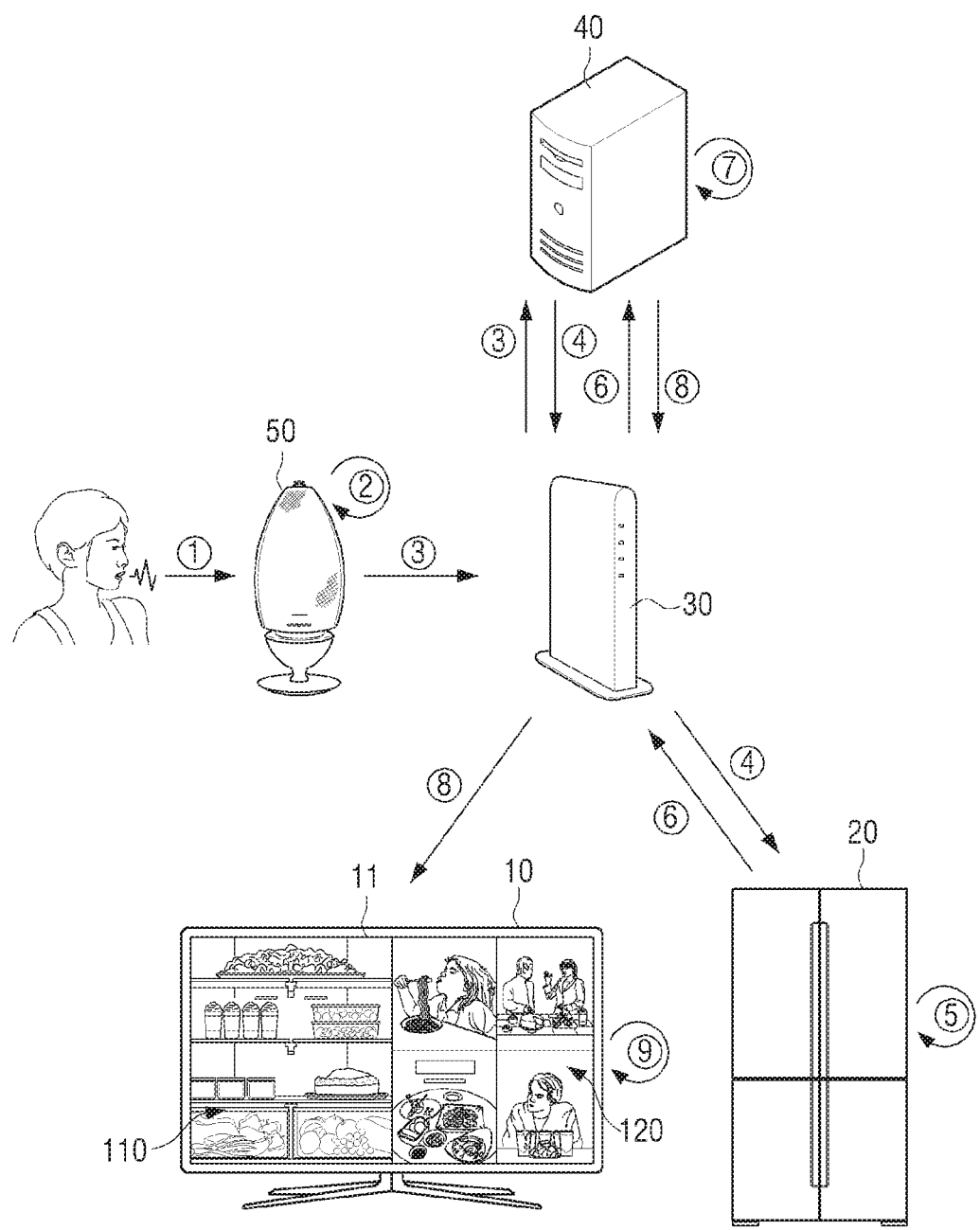
FIG. 8 is a diagram illustrating a situation in which a content recommendation system executes a function by using a user command input to a server.

FIG. 8 is a diagram illustrating a situation in which a content recommendation system executes a function by using a user command input to a server according to an embodiment.

Referring to FIG. 8, the content recommendation system 1 may include a display device 10, a server 40, a refrigerator 20, a home gateway 30, or an artificial intelligence speaker 50.

According to an embodiment, the display device 10, the server 40, the refrigerator 20, the artificial intelligence speaker 50 or the home gateway 30 may all be connected through the communication network. For example, the artificial intelligence speaker 50, the display device 10 and the refrigerator 20 may be connected with the home gateway 30 through the communication network, and the home gateway 30 may be connected with the server 40 through the communication network. However, the connection structure through the communication network is not limited thereto, and may be comprised of various structures.

For example, the artificial intelligence speaker 50, the display device 10, the refrigerator 20, and the server 40 may use the communicator included in each device to perform direct communication. The artificial intelligence speaker 50, the display device 10, and the refrigerator 20 has been described below as performing communication with the server 40 through the home gateway 30 to comprise the content recommendation system 1, but the embodiment is not limited thereto, and the artificial intelligence speaker 50, the display device 10, and the refrigerator 20 may perform direct communication with the server 40, and comprise the content recommendation system 1 by transmitting and receiving the necessary data or signal.

In operation ①, the artificial intelligence speaker 50 may receive a user input (e.g., utterance) requesting information related to the refrigerator. For example, the artificial intelligence speaker 50 may use the microphone (not shown) included in the artificial intelligence speaker 50 to receive user input requesting information related to the refrigerator.

The user input requesting information related to the refrigerator may be at least one of, for example, "display broadcast related to food ingredients in the refrigerator," "what kind of food can be made with the ingredients in the refrigerator?" or "what is currently in the refrigerator?" However, the user input is not limited thereto, and may include various user input requesting information related to the refrigerator.

In operation ②, the artificial intelligence speaker 50 may recognize the user utterance by using the internally stored voice recognition algorithm (or, voice recognition module), and generate an instruction for performing the function related to the recognized utterance. The instruction for performing the function related to the recognized utterance may, for example, be a function recommending a broadcast content on cooking related to the ingredients stored in the refrigerator 20.

In operation ③, based on the result of utterance recognition, the artificial intelligence speaker 50 may transmit the instruction generated based on the user utterance to the server 40 through the home gateway 30.

In operation ④, the server 40 may, in response to the received instruction, transmit the request instruction requesting the transmission of the image photographed by using the camera included in the refrigerator 20 to the refrigerator 20.

According to an embodiment, the server 40 may transmit a request instruction requesting the transmission of an image to the refrigerator 20 to the refrigerator 20 by using the home gateway 30.

According to various embodiments, the home gateway 30 may use the internally stored voice recognition algorithm (or, voice recognition module) to recognize the user utterance, and generate an instruction for performing the function related to the recognized utterance. In this case, the home gateway 30 may transmit the request instruction requesting the transmission of the image photographed by using the camera included in the refrigerator to the server 40 to the refrigerator 20.

In operation ⑤, the refrigerator 20 may, in response to the received request instruction, obtain at least one image by using the camera included in the refrigerator 20. For example, the refrigerator 20 may obtain at least one or more images by using a plurality of cameras capable of photographing the inside of the refrigerator 20.

In operation ⑥, the server may receive at least one or more images obtained by the refrigerator 20 through the home gateway 30.

In operation ⑦, the server 40 may obtain the name of the food ingredient by recognizing the food ingredient included in the at least one image received from the refrigerator 20.

According to an embodiment, the server 40 may recognize the object (e.g., food ingredient) included in the at least one image. The server 40 may, for example, recognize the shape of the object by analyzing the shape of the edge after changing the image to an image emphasizing the edge area.

According to an embodiment, the server 40 may obtain a first information (e.g., first text) related to the name of the food ingredient by identifying the name of the recognized object.

In operation ⑦, the server 40 may generate a broadcast content on cooking by using the first text and a second information (e.g., second text) related to the cooking information recognized from the media content by the server 40.

According to an embodiment, the server 40 may recognize cooking information in the media content stored in the server 40 in the text form. For example, the server 40 may recognize text by applying a text recognition method (e.g., optical character reader (OCR) technology) to the respective image frames included in the media content of a moving image form. The server 40 may identify at least one image frame related to the cooking information (e.g., name or cooking method of a food ingredient, etc.) of the media content, and obtain a second text related to the cooking information by using the text included in the image frame. The second text may be generated in plurality according to the number of media content stored by the server 40.

According to an embodiment, the server 40 may obtain a broadcast content on cooking to be transmitted to the display device 10 of the broadcast content on cooking by using the first text with the name of the food ingredient included and the second text related to the cooking information.

For example, the server 40 may identify the second text which includes a name identical or similar to the name of the food ingredient included in the first text of the plurality of second texts. The server 40 may obtain (or, add) the broadcast content on cooking by using the media content corresponding to the identified at least one or more second texts.

According to various embodiments, the server 40 may obtain a media content viewed by a third party which includes the same or similar food ingredients with the food ingredient included in the first text. The server 40 may identify a second text which includes a name identical or similar to the name of the food ingredient included in the first text of the second texts corresponding to the obtained media content. The server 40 may obtain a media content corresponding to the identified at least one or more second texts as the broadcast content on cooking.

According to various embodiments, the server 40 may obtain a media content which is most played back during a certain period (e.g., recent 3 months, 6 months, or 1 year). The server 40 may identify a second text which includes a name identical or similar to the name of the food ingredient included in the second text of the second texts corresponding to the obtained media content. The server 40 may obtain the media content corresponding to the identified at least one or more second texts as the broadcast content on cooking.

In operation ⑧, the display device 10 may receive at least one of the second text related to the cooking information obtained by the server 40 and the list of broadcast content on cooking obtained by the server 40 through the home gateway 30.

In operation ⑨, the display device 10 may display the received broadcast content on cooking with the image including the food ingredient.

According to an embodiment, the display device 10 may divide a display into two areas, and display an image 110 including a food ingredient in the first area and display a broadcast content on cooking 120 in the second area. However, the method of displaying the broadcast content on cooking 120 and the image 110 including the food ingredient by the display device 10 is not limited thereto.

Figure 9:
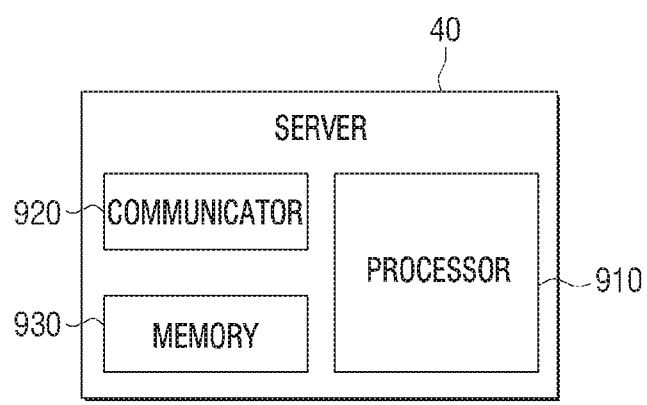
FIG. 9 is a schematic block diagram of a server according an embodiment.

FIG. 9 is a schematic block diagram of a server according an embodiment.

Referring to FIG. 9, the server may include a processor 910, a communicator 920, and a memory 930. However, the embodiment is not limited thereto. For example, the server 40 may further include an element or not include some elements.

According to an embodiment the processor 910 may control the overall operation of the server 40. For example, the processor 910 may receive a user input through the communicator 920. The processor 910 may control the memory 930 to execute a stored program, and may call or store necessary information.

According to an embodiment, the processor 910 may be configured to, based on an input requesting information related to the refrigerator 20 being received through the communicator 720, control the communicator 920 for a request instruction requesting the transmission of an image obtained by using the camera included in the refrigerator 20 to be transmitted to the refrigerator 20.

According to an embodiment, in response to the request instruction, the processor 910 may receive at least one image from the refrigerator 20 through the communicator 920, and obtain a first text related to a name of a food ingredient by recognizing the food ingredient included in the at least one image.

According to an embodiment, the processor 910 may be configured to obtain the broadcast content on cooking by using the first text and the second text related to the cooking information recognized from the media content, and control the communicator 920 to transmit the broadcast content on cooking and the image including the food ingredient to the external device.

According to an embodiment, the communicator 920 may connect the server 40 with the external device by control of the processor 910. The communicator 920 may include one of the elements which implement the various wired or wireless communication methods such as a wireless LAN, Bluetooth, and a wired Ethernet corresponding to the function and structure of the server 40.

According to an embodiment, the memory 930 may store instructions set for the processor 910 to, based on an input requesting information related to the refrigerator being received, control the communicator 920 for a request instruction requesting the transmission of an image obtained by using the camera positioned inside the refrigerator 20 to be transmitted to the refrigerator 20, obtain a first text related to a name of a food ingredient by recognizing the food ingredient included in the at least one image by receiving the at least one image from the refrigerator 20 in response to the request instruction through the communicator 920, obtain a broadcast content on cooking by using the first text and the second text related to the cooking information recognized from the media content, and control the communicator 920 to transmit the broadcast content on cooking and the image to an external device.

Figure 10:
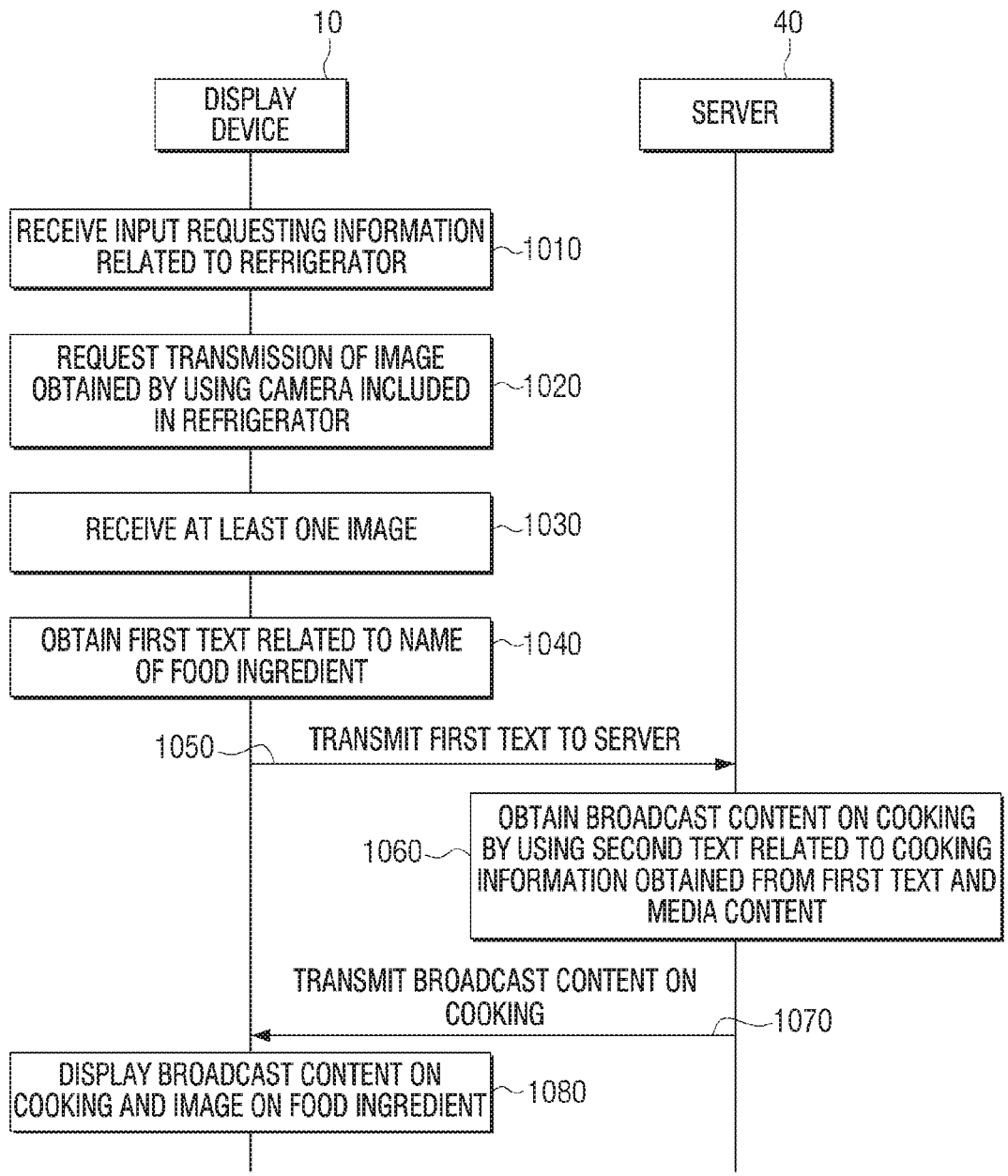
FIG. 10 is a flowchart illustrating a situation in which a content recommendation system executes a function by using a user command input to a display device according to an embodiment.

FIG. 10 is a flowchart illustrating a situation in which a content recommendation system executes a function by using a user command input to a display device according to an embodiment.

In operation 1010, the display device 10 may receive an input requesting information related to the refrigerator In operation 1020, the display device 10 may request for the transmission of the image obtained by using the camera positioned in the refrigerator to the refrigerator.

In operation 1030, the display device 10 may receive at least one image.

In operation 1040, the display device 10 may obtain the first text related to the name of the food ingredient. For example, the display device 10 may identify the food ingredient included in the at least one image and obtain the first text.

In operation 1050, the display device 10 may transmit the first text to the server 40.

In operation 1060, the server 40 may use the first text and the second text related to the cooking information obtained from the media content to obtain the broadcast content on cooking.

In operation 1070, the server 40 may display the broadcast content on cooking to the display device 10.

In operation 1080, the display device 10 may display the broadcast content on cooking with the image on the food ingredient.

Figure 11:
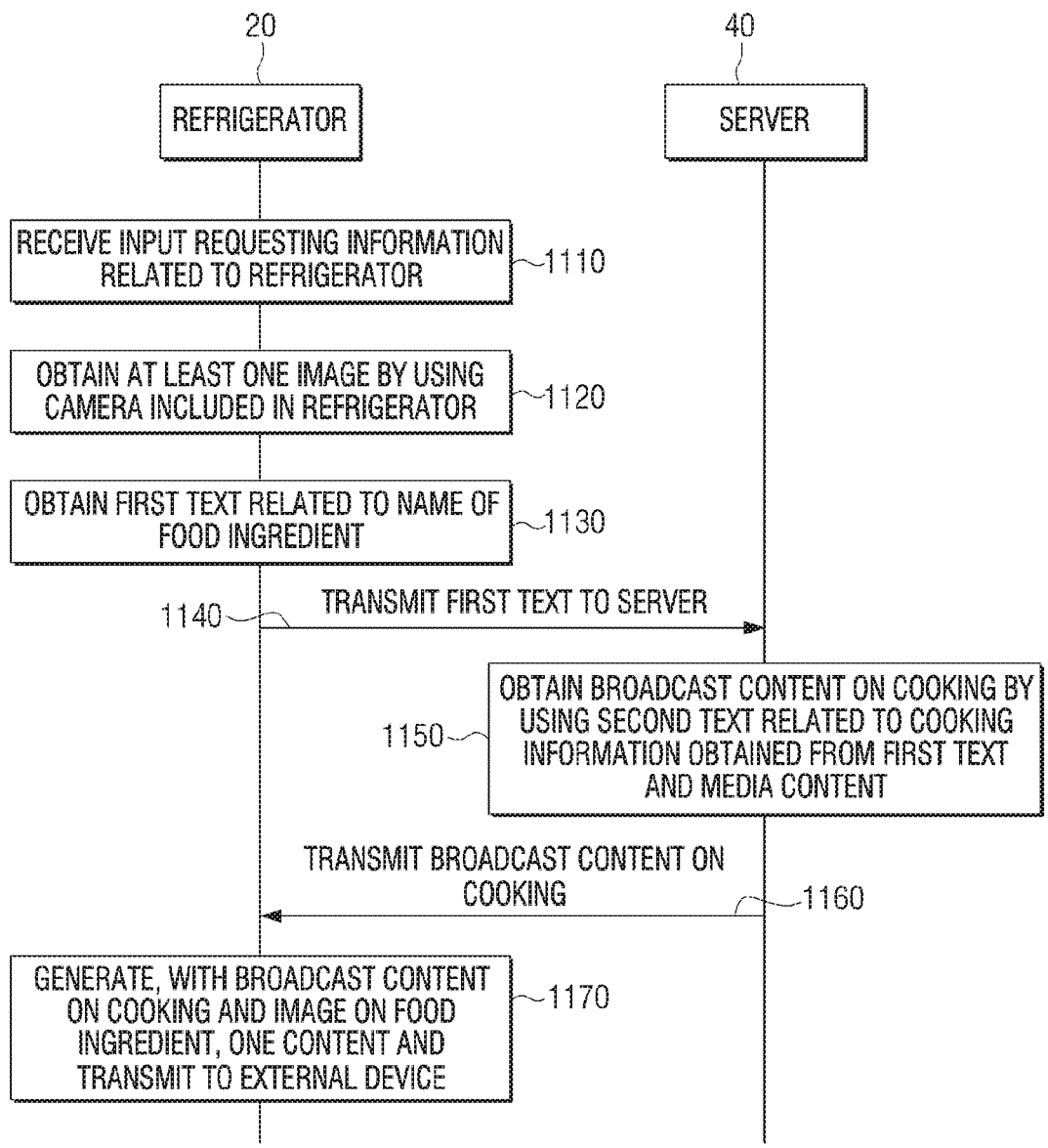
FIG. 11 is a flowchart illustrating a situation in which a content recommendation system executes a function by using a user command input to a refrigerator according to an embodiment.

FIG. 11 is a flowchart illustrating a situation in which a content recommendation system executes a function by using a user command input to a refrigerator according to an embodiment.

In operation 1111, the refrigerator 20 may receive an input requesting information related to the refrigerator.

In operation 1120, the refrigerator 20 may obtain at least one image by using the camera included in the refrigerator.

Referring to operation 1130, the refrigerator 20 may obtain the first text related to the name of the food ingredient. For example, the refrigerator 20 may obtain the first text by identifying the food ingredient included in the at least one image.

Referring to operation 1140, the refrigerator 20 may transmit the first text to the server 40.

Referring to operation 1150, the server 40 may obtain the broadcast content on cooking by using the first text and the second text related to the cooking information obtained from the media content.

In operation 1160, the server 40 may transmit the broadcast content on cooking to the refrigerator 20.

In operation 1170, the refrigerator 20 may, with the broadcast content on cooking and the image on the food ingredient, generate one content and transmit to the external device (e.g., display device). However, the embodiment is not limited thereto. For example, the refrigerator 20 may transmit the broadcast content on cooking and the image on the food ingredient to the external device, respectively.

Figure 12:
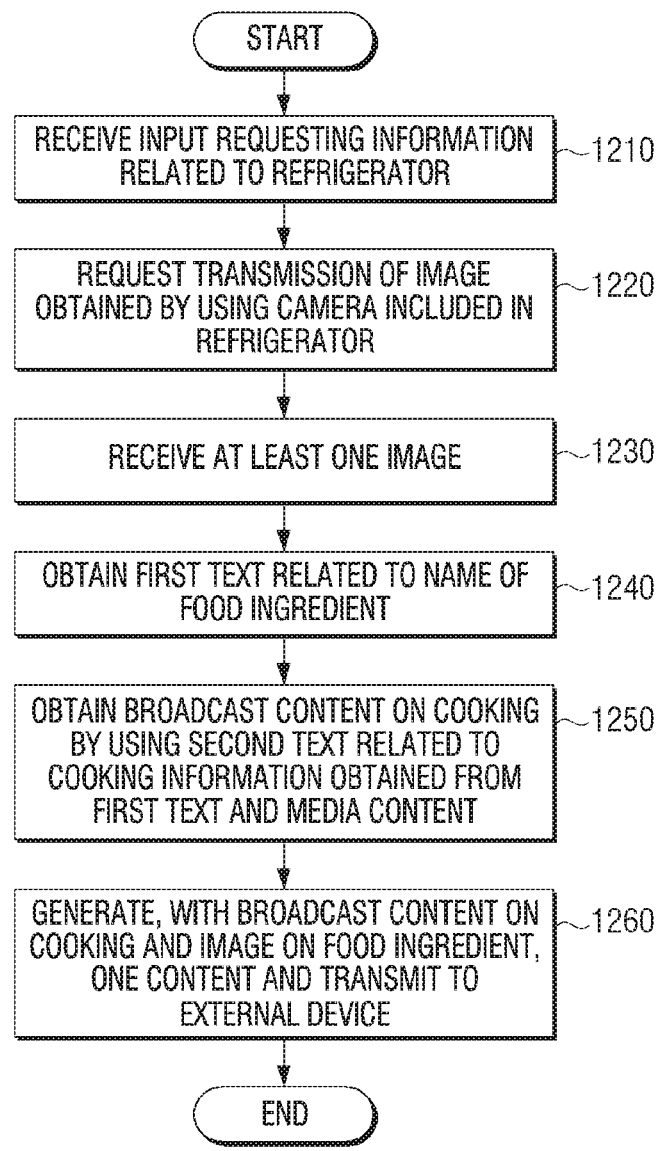
FIG. 12 is a flowchart illustrating a situation in which a content recommendation system executes a function by using a user command input to a server according to an embodiment.

FIG. 12 is a flowchart illustrating a situation in which a content recommendation system executes a function by using a user command input to a server according to an embodiment.

In operation 1210, the server 40 may receive input requesting information related to the refrigerator.

In operation 1220, the server 40 may request for the transmission of the image obtained by using the camera included in the refrigerator to the refrigerator.

In operation 1230, the server 40 may receive at least one image.

In operation 1240, the server may obtain a first text corresponding to the name of the food ingredient. For example, the server 40 may obtain the first text by identifying the food ingredient included in the at least one image.

In operation 1250, the server 40 may obtain the broadcast content on cooking by using the first text and the second text related to the cooking information obtained from the media content.

In operation 1260, the server 40 may, with the broadcast content on cooking and the image on the food ingredient, generate one content and transmit to the external device. However, the embodiment is not limited thereto. For example, the server may transmit the broadcast content on cooking and the image on the food ingredient to the external device, respectively.

Figure 13:
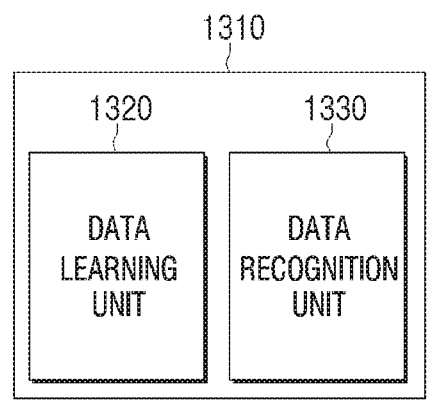
FIG. 13 is a block diagram of a processor according to an embodiment.

FIG. 13 is a block diagram of a processor according to an embodiment.

Referring to FIG. 13, the processor 1310 according to the various embodiments may include a data learning unit 1320 and a data recognition unit 1330. The processor 1310 may include the processor 210 of FIG. 2, the processor 710 of FIG. 7, and processor 910 of FIG. 9.

The data learning unit 1320 may train the data recognition model to have a criterion for estimating a broadcast content on cooking. The data learning unit 1320 may train the data recognition model to have a criterion on which learning data to use to estimate the broadcast content on cooking, and how the broadcast content on cooking may be estimated by using the learning data.

According to an embodiment, the data learning unit 1320 may train the data recognition model by using information on a food ingredient (e.g., name of the food ingredient, image of the food ingredient, etc.) and the broadcast content on cooking related to the food ingredient information as learning data.

For example, the learning data may be an image of flour, an image of a strawberry, and a broadcast content on cooking including flour and strawberries in the recipe.

According to various embodiments, the learning data may be an image of meat, an image of kimchi, and a broadcast content on cooking including meat and kimchi in the recipe.

Accordingly, the data learning unit 1320 may train the data recognition model by using the various food ingredient information and the broadcast content on cooking including a recipe related to the food ingredient information as learning data.

The data recognition unit 1330 may, based on data for recognition of various types, estimate the broadcast content on cooking. The data recognition unit 1330 may estimate the broadcast content on cooking based on the input information on the food ingredient (e.g., name of the food ingredient, image of the food ingredient, etc.) by using the trained data recognition model.

According to an embodiment, the data recognition unit 1330 may use the input information of the food ingredient as an input value of the data recognition model, and may use the result of estimating the broadcast content on cooking and the user response on the estimated result in updating the data recognition model.

For example, if a text including the name of the food ingredient which includes flour, eggs, and sweet potato is input, the data recognition unit 1330 may obtain the broadcast content on cooking including the flour, eggs, and sweet potato in the cooking method.

The data recognition model may be built taking into consideration the application field of the recognition model, the object of learning, the computer performance of the device, or the like. The data recognition model may, for example, be a model based on a neural network. The data recognition model may be designed to simulate the human brain structure on a computer. The data recognition model may include a plurality of weighted network nodes that may simulate a neuron of a human neural network. The plurality of network nodes may each establish a connection relationship so that the neurons simulate the synaptic activity of the neurons sending and receiving signals through the synapse. The data recognition model may include, for example, a neural network model, or a deep learning model developed from a neural network model. In the deep learning model, a plurality of network nodes are located at different depths (or, layers), and may transmit and receive data according to a convolution connection relationship. Examples of data recognition model may include, but are not limited to, a deep neural network (DNN), a recurrent neural network (RNN), and a bidirectional recurrent deep neural network (BRDNN).

At least one of the data learning unit 1320 or the data recognition unit 1330 may be produced to at least one hardware chip form and mounted to an electronic device. For example, at least one of the data learning unit 1320 or the data recognition unit 1330 may be produced in a dedicated hardware chip form for artificial intelligence (AI) or produced as a part of a conventional generic-purpose processor (e.g., central processing unit (CPU) or application processor) or a graphics dedicated processor (e.g., graphics processing unit (GPU)) and mounted to the various above-described electronic devices.

According to an embodiment, the dedicated hardware chip for AI may be a dedicated processor specializing in probability calculation, and may quickly process calculation operations in the field of artificial intelligence such as machine learning due to performance in parallel execution being faster than conventional generic-use processors.

The data learning unit 1320 and the data recognition unit 1330 may be mounted to one electronic device, or mounted to separate electronic devices respectively. For example, one of the data learning unit 1320 or the data recognition unit 1330 may be included in the display device 10 or the refrigerator 20, and the remaining one may be included in the server 40. In addition, the data learning unit 1320 and the data recognition unit 1330 may, through wired and wireless communication, provide a model information built by the data learning unit 1320 to the data recognition unit 1330, and may also provide data input to the data recognition unit 1330 to the data learning unit 1320 as additional learning data.

At least one of data learning unit 1320 and data recognition unit 1330 may be implemented as a software module. Based on at least one of the data learning unit 1320 and the data recognition unit 1330 being implemented as a software module (or, program module including an instruction), the. software module may be stored in a non-transitory computer readable media. In addition, the at least one software module may be provided by an operation system (OS) or provided by a predetermined application. Alternatively, a part of the at least one software module may be provided by the OS and the remaining part may be provided by a predetermined application.

Figure 14:
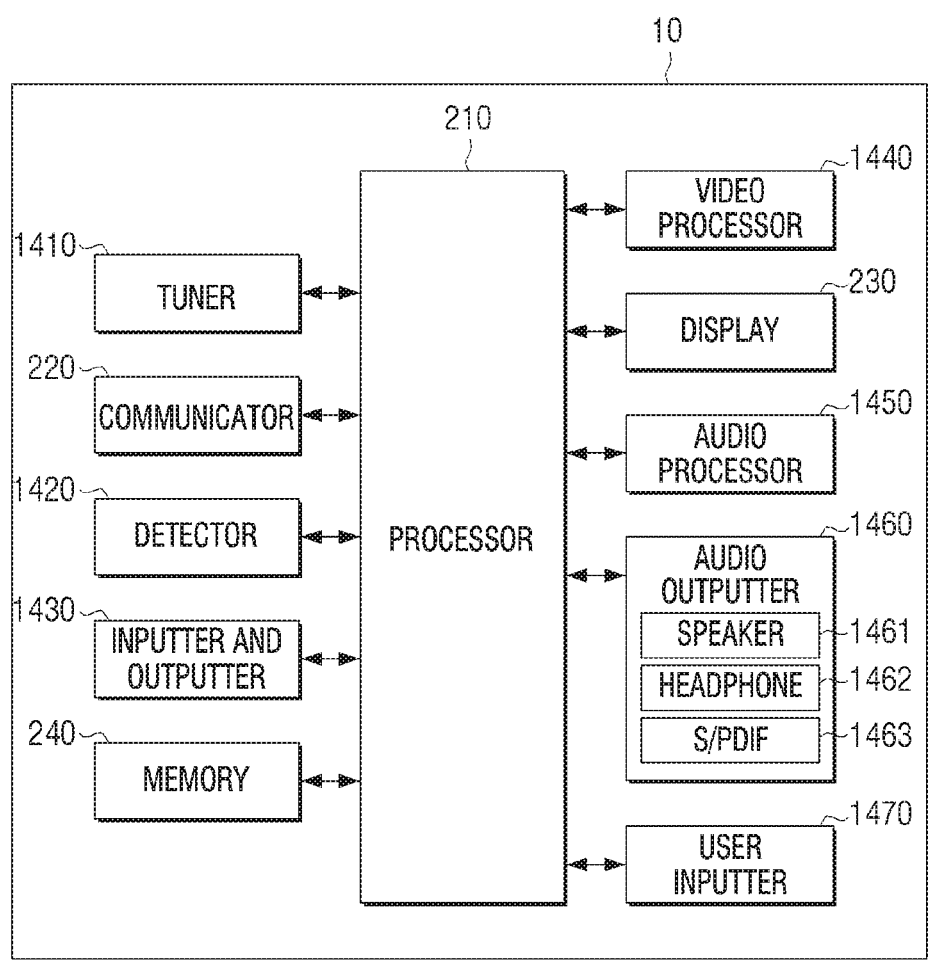
FIG. 14 is a block diagram illustrating a configuration of a display device according to another embodiment.

FIG. 14 is a block diagram illustrating a configuration of a display device according to another embodiment.

As illustrated in FIG. 14, the display device 10 may further include a tuner 1410, a detector 1420, an inputter and outputter 1430, a video processor 1440, an audio processor 1450, and an audio outputter 1460 in addition to the processor 210, the display 230, the communicator 220, the inputter 250, and the memory 240. With respect to the processor 210, the display 230, the communicator 220, the inputter 250, and the memory 240, the same descriptions as described in FIG. 2 will be omitted from FIG. 14.

The tuner 1410 may select a broadcast signal received by wired or wireless communication by tuning only a frequency of a channel to be received in the display device 10 among a number of radio wave components through amplification, mixing, resonance, and the like. The broadcast signal may include an audio, a video, and additional information (e.g., electronic program guide (EPG)).

The tuner 1410 may receive a broadcast signal from a frequency band corresponding to a channel number according to the user input.

The tuner 1410 may receive a broadcast signal from various sources such as a terrestrial broadcast, a cable broadcast, a satellite broadcast, and an internet broadcast. The tuner 1410 may also receive the broadcast signal from sources such as an analog broadcast or a digital broadcast. The broadcast signal received through the tuner 1410 may be decoded (e.g., audio decoding, video decoding or additional information decoding) and separated to an audio, a video, and/or an additional information. The separated audio, video and/or additional information may be stored in the memory 240 by the control of the processor 210.

The tuner 1410 of the display device 10 may be one or in plurality. The tuner 1410 may be implemented with the display device 10 as an all-in-one or as a separate device (e.g., set-top box, not shown) with a tuner electrically connected with the display device 10, or implemented as a tuner (not shown) connected to the inputter and outputter 1430.

The communicator 220 may connect the display device 10 with the external device (e.g., audio device, etc.) by the control of the processor 210. The processor 210 may transmit/receive content to the external device connected through the communicator 220, and may download an application from the external device or perform web browsing. The communicator 220 may include one of a wireless LAN, Bluetooth, or an wired Ethernet corresponding to the function and structure of the display device 10.

In addition, the communicator 220 may include the combination of the wireless LAN, Bluetooth, and the wired Ethernet. The communicator 220 may receive the control signal of the control device (e.g., remote control, smart phone) by the control of the processor 210. The control signal may be implemented to a Bluetooth type, a RF signal type or a Wi-Fi type. The communicator 220 may further include other short range communications (e.g., near field communication (NFC, not shown), Bluetooth low energy (BLE, not shown)) other than Bluetooth.

The detector 1420 may detect a user voice, a user image, or a user interaction, and include a microphone, a camera part, and an optical receiver.

The microphone may receive a voice uttered by the user. The microphone may convert the received voice to an electrical signal and output to the processor 210. The user voice may include, for example, a voice corresponding to a menu or function of the display device 10.

The camera part (not shown) may receive an image (e.g., consecutive frames) corresponding to a user motion including a gesture within the camera recognition range. The processor 210 may, by using the recognition result of the received motion, select a menu to be displayed in the display device 10 or perform a control corresponding to the motion recognition result. For example, adjusting channel, adjusting volume, moving an indicator, moving a cursor, and the like may be included.

The optical receiver (not shown) may receive an optical signal (including a control signal) received from an external control device through an optical window (not shown) of a bezel of the display 230. The optical receiver may receive an optical signal corresponding to the user input (e.g., touch, press, touch gesture, voice, or motion) from the control device. The control signal may be extracted from the received optical signal by the control of the processor 320.

The inputter and outputter 1430 may receive a video (e.g., moving image, etc.), an audio (e.g., voice, music, etc.) an additional information (e.g., EPG, etc.), and the like from the outside of the display device 10 by the control of the processor 210. The inputter and outputter 1430 may include one of a high-definition multimedia interface (HDMI) port, a component jack, a PC port, or a USB port. The inputter and outputter 1430 may include a combination of the HDMI port, the component jack, the PC port, and the USB port.

The processor 210 may control the overall operation of the display device 10 and the flow of signals between the inner elements of the display device 10, and perform the function of processing data. The processor 210 may, based on a receiving user input or satisfying a condition which is pre-set and stored, execute the OS and various applications stored in the memory 240.

The video processor 1440 may process the image data to be displayed on the display 230 and perform various image processing operations such as decoding, rendering, scaling, noise filtering, converting frame rate and converting resolution on image data.

The display 230 may display image data processed in the video processor 1440. The display 230 may display a video with the broadcast signal included received through the tuner 1410 by the control of the processor 210. In addition, the display 230 may display content (e.g., moving image) input through the communicator 220 or the inputter and outputter 1430. The display 230 may output an image stored in the memory 240 by the control of the processor 210. In addition, the display 230 may display a voice user interface (UI; e.g., including a voice instruction guide) for performing a voice recognition task corresponding to voice recognition or a motion UI (e.g., including a user motion guide for recognizing motion) for performing a motion recognition task corresponding to motion recognition.

If the display 230 is implemented to a touch screen, the display 230 may be used as a input device in addition to an output device. The display 230 may include at least one of a liquid crystal display, a thin film transistor-liquid crystal display, an organic limit-emitting diode, a flexible display, a 3D display, and an electrophoretic display.

In addition, according to the implementation form of the display device 10, the display device 10 may include two or more displays 230.

The audio processor 1450 may perform processing on the audio data. In the audio processor 1450, various processing such as decoding or amplification, and noise filtering on the audio data may be performed. The audio processor 150 may include a plurality of audio processing modules for processing audio corresponding to the plurality of content.

The audio outputter 1460 may output audio included in the broadcast signal received through the tuner 1410 by the control of the processor 210. The audio outputter 1460 may output the audio (e.g., voice, sound) input through the communicator 220 or the inputter and outputter 1430. In addition, the audio outputter 1460 may output audio which is stored in the memory 240 by the control of the processor 210. The audio outputter 1460 may include at least one of a speaker 1461, a headphone output terminal 1462, or a Sony/Philips Digital Interface (S/PDIF) output terminal 1463. The audio outputter 1460 may include a combination of the speaker 1461, the headphone output terminal 1462 and the S/PDIF output terminal 1463.

The user inputter 1470 may refer to a means for inputting data to control the display device 10 by the user. The user inputter 1470 may correspond to the inputter 250 of FIG. 2. For example, the user inputter 1470 may include a key pad, a dome switch, a touch pad (e.g., a touch type capacitive method, a pressure type resistive method, infrared beam sensing method, a surface acoustic wave method, an integral strain gauge type method, a Piezo effect method, etc.), a jog wheel, a jog switch, and the like, but is not limited thereto.

For example, the user input may include an input moving the position of the focus, an input selecting the application which the current focus is located, or the like. If the user inputter 1470 is comprised on a key pad or a dome switch, the user input moving the position of the focus may be an input clicking or pressing a key corresponding to a specific direction. In addition, if the user inputter 1470 is comprised of a touch pad, the input may be touching a key corresponding to a specific direction, but the embodiment is not limited thereto.

The term "module" used in the disclosure may include a unit implemented as a hardware, a software or a firmware, and may be used interchangeably with terms such as, for example, logic, logical block, component, circuit, or the like. The module may be a minimum unit of the component formed integrally or performing one or more functions or a part thereof. For example, according to an embodiment, the module may be implemented in the form of an application-specific integrated circuit (ASIC).

The various embodiments of the disclosure may be implemented as a software including one or more instructions stored in a machine (e.g., display device 10) readable storage medium (e.g., memory 240). For example, the processor (e.g., processor 210) of the machine (e.g., display device 10) may call at least one instruction of the one or more instructions stored in the storage medium and execute the instructions. This allows the machine to be operated by performing at least one function according to the called at least one instruction. The at least one instructions may include a code generated by a compiler or executed by an interpreter. The machine-readable storage medium may be provided in the form of a non-transitory storage medium. The term "non-transitory" only denotes that a storage medium does not include a signal (e.g., electromagnetic wave) but is tangible, and does not distinguish the case in which data is semi-permanently stored in a storage medium from the case in which data is temporarily stored in a storage medium.

According to one or more embodiments of the disclosure, a method may be provided in a computer program product. The computer program product may be exchanged between a seller and a purchaser as a commodity. The computer program product may be distributed in the form of a machine-readable storage medium (e.g., compact disc read only memory (CD-ROM)) or distributed online through an application store (e.g. PlayStore™) or directly between two user devices (e.g., smart phones). In the case of on-line distribution, at least a portion of the computer program product may be at least stored temporarily stored or temporarily generated in a machine readable storage medium such as a manufacturer's server, a server of an application store, or a memory of a relay server.

According to various embodiments, each of the elements (e.g., a module or a program) of the above-described elements may be comprised of a single entity or a plurality of entities. According to various embodiments, one or more elements of the above-described corresponding elements or operations may be omitted, or one or more other elements or operations may be further included. Alternatively or additionally, a plurality of elements (e.g., modules or programs) may be integrated into one entity. In this case, the integrated element may perform one or more functions of the element of each of the plurality of elements in the same or similar manner as being performed by the respective element of the plurality of elements prior to integration. According to various embodiments, the operations performed by a module, program, or other elements may be performed sequentially, in a parallel, repetitively, or in a heuristically manner, or one or more of the operations may be performed in a different order, omitted, or one or more other operations may be further included.

What is claimed is:

1. A display device, comprising:
   a display;
   a communicator including a communication circuit;
   a processor; and
   a memory,
   wherein the memory stores instructions for causing the processor to:
      based on receiving an input to the display device requesting information related to a refrigerator, control the communicator to transmit to the refrigerator a request requesting transmission of an image of contents of the refrigerator obtained using a camera of the refrigerator;
      control the communicator to receive at least one image from the refrigerator based on the request;
      obtain first text information related to a name of a food ingredient based on recognizing the food ingredient in the at least one image;
      control the communicator to transmit the first text information to the server;
      control the communicator to receive broadcast content on cooking obtained by the server; and
      control the display to display the broadcast content on cooking in a first display area of the display and, while the broadcast content on cooking is displayed in the first display area of the display, display an image of inside the refrigerator in a second display area of the display by distinguishing the food ingredient included in the broadcast content from other food ingredients inside the refrigerator,
   wherein the broadcast content on cooking is obtained by the server by identifying, from media content pre-stored in the server, image frames for which second text information related to cooking information, recognized from text included in the image frames, corresponds to the first text information and obtaining, as the broadcast content on cooking, media content from the pre-stored media content corresponding to the identified image frames.

2. The display device of claim 1, wherein the first text information comprises:
   first text related to the name of the food ingredient recognized in the at least one image; and
   wherein the second text information related to the cooking information comprises:
      second text recognized from the image frames of the pre-stored media content.

3. The display device according to claim 1, wherein the cooking information comprises a recipe.

4. The display device of claim 1, wherein the broadcast content on cooking comprises:
   the image frames of the pre-stored media content for which the second text information corresponds to the first text information.

5. The display device of claim 1, wherein the broadcast content on cooking comprises:
   a video clip comprising the image frames of the pre-stored media content for which the second text information corresponds to the first text information.

6. The display device of claim 1, wherein the instructions further cause the processor to:
   based on an input for selecting the broadcast content on cooking to be displayed on the display being received, playback the selected broadcast content.

7. The display device of claim 6, wherein the instructions further cause the processor to:
   identify a food ingredient requiring purchase using the selected broadcast content and the first text information.

8. The display device of claim 7, wherein the instructions further cause the processor to:
   display the food ingredient requiring purchase on a user interface for guiding purchase of the food ingredient.

9. A refrigerator, comprising:
   a camera;
   a processor; and
   a memory,
   wherein the memory stores instructions for causing the processor to:
      based on receiving a request requesting information related to the refrigerator, obtain at least one image of contents of the refrigerator using the camera;
      obtain first text information related to a food ingredient based on recognizing the food ingredient in the at least one image;
      transmit the first text information to a server;
      receive broadcast content on cooking obtained by the server; and
      transmit the broadcast content on cooking and an image of inside the refrigerator including the food ingredient to an external device such that the broadcast content on cooking is displayed in a first display area of a display of the external device and, while the broadcast content on cooking is displayed in the first display, the image of inside the refrigerator including the food ingredient included in the broadcast content is displayed in a second display area of the display of the external device, the food ingredient being distinguished from other food ingredients inside the refrigerator, wherein the broadcast content on cooking is obtained by the server by identifying, from media content pre-stored in the server, image frames for which second text information related to cooking information, recognized from text included in the image frames, corresponds to the first text information and obtaining, as the broadcast content on cooking, media content from the pre-stored media content corresponding to the identified image frames.

10. A server, comprising:
a communicator including a communication circuit;
a processor; and
a memory,
wherein the memory stores instructions for causing the processor to:
  based on receiving an input via the communicator requesting information related to the refrigerator being received, control the communicator to transmit a request requesting transmission of an image of contents of the refrigerator obtained using a camera of the refrigerator;
  in response to the request, control the communicator to receive at least one image from the refrigerator;
  obtain first text information related to a name of a food ingredient based on recognizing the food ingredient in the at least one image;
  obtain broadcast content on cooking by identifying, from media content pre-stored in the server, image frames for which second text information related to cooking information, recognized from text included in the image frames, corresponds to the first text information and obtaining, as the broadcast content on cooking, media content from the pre-stored media content corresponding to the identified image frames; and
  control the communicator to transmit the broadcast content on cooking and an image of inside the refrigerator including the food ingredient to an external device such that the broadcast content on cooking is displayed in a first display area of a display of the external device and, while the broadcast content on cooking is displayed in the first display, the image of inside the refrigerator including the food ingredient included in the broadcast content is displayed in a second area of the display of the external device, the food ingredient being distinguished from other food ingredients inside the refrigerator.

11. A control method of display device, the method comprising:
  based on receiving an input to the display device requesting information related to a refrigerator, transmitting to the refrigerator a request requesting transmission of an image of contents of the refrigerator obtained using a camera of the refrigerator;
  receiving at least one image from the refrigerator based on the request;
  obtaining first text information related to a name of a food ingredient based on recognizing the food ingredient in the at least one image;
  transmitting the first text information to a server;
  receiving broadcast content on cooking obtained by the server; and
  displaying the broadcast content on cooking in a first display area of the display device and, while the broadcast content on cooking is displayed in the first display area of the display, displaying an image of inside the refrigerator in a second display area of the display device by distinguishing the food ingredient included in the broadcast content from other food ingredients inside the refrigerator,
  wherein the broadcast content on cooking is obtained by the server by identifying, from media content pre-stored in the server, image frames for which second text information related to cooking information, recognized from text included in the image frames, corresponds to the first text information and obtaining, as the broadcast content on cooking, media content from the pre-stored media content corresponding to the identified image frames.

12. The control method of claim 11, wherein the first text information comprises:
  first text related to the name of the food ingredient recognized in the at least one image,
and
  wherein the second text information related to the cooking information comprises:
    second text recognized from the image frames of the pre-stored media content.

13. The control method of claim 11, wherein the broadcast content on cooking comprises:
  the image frames of the pre-stored media content for which the second text information corresponds to the first text information.

14. The control method of claim 11, wherein the broadcast content on cooking comprises:
  a video clip comprising the image frames of the pre-stored media content for which the second text information corresponds to the first text information.

15. The control method of claim 11, further comprising:
  based on an input for selecting the displayed broadcast content on cooking, playing back the selected broadcast content on cooking.

* * * * *